United States Patent [19]
Bernet et al.

[11] Patent Number: 5,949,664
[45] Date of Patent: Sep. 7, 1999

[54] CURRENT STIFF CONVERTERS WITH RESONANT SNUBBERS

[75] Inventors: Steffen Bernet, Bammentael, Germany; Thomas A. Lipo, Middleton; Braz de J. Cardoso Filho, Madison, both of Wis.

[73] Assignee: Wisconsin Alumni Research Foundation, Madison, Wis.

[21] Appl. No.: 09/099,635

[22] Filed: Jun. 18, 1998

Related U.S. Application Data

[60] Provisional application No. 60/050,205, Jun. 19, 1997.

[51] Int. Cl.$^6$ .................................................. H02M 5/45
[52] U.S. Cl. ................................................ 363/37; 363/34
[58] Field of Search ..................... 363/34, 35, 37, 363/53, 54, 56, 57, 85, 96, 128, 135, 136

[56] References Cited

U.S. PATENT DOCUMENTS

| | | |
|---|---|---|
| 4,146,921 | 3/1979 | Akamatsu . |
| 4,428,023 | 1/1984 | Maier . |

(List continued on next page.)

FOREIGN PATENT DOCUMENTS

| | | |
|---|---|---|
| 0489948 A1 | 6/1992 | European Pat. Off. . |

OTHER PUBLICATIONS

P.D. Ziogas, Y.G., Kang, V.R. Sefanovic, "PWM control techniques for rectifier filter minimization", IEEE Trans. Ind. Applic., vol. 21, No. 5, Sep./Oct. 1985, pp. 1206–1213.

Heinz Willi Van Der Broeck, et al., "Analysis and Realization of a Pulsewidth Modulator Based on Voltage Space Vectors", IEEE Trans. Ind. App., vol 24, No. 1, Jan./Feb., 1988, pp. 142–150.

R.W. DeDoncker & J.P. Lyons, "The Auxiliary Resonant Commutated Pole Converter", IEEE IAS, 1990, pp. 1228–1235.

P.N. Enjeti, P.D. Ziogas, J.F. Lindsay, "A current source PWM inverter with instantaneous current control capability", IEEE Trans. Ind. Applic., vol. 27, No. 3, May/Jun. 1991, pp. 582–588.

(List continued on next page.)

*Primary Examiner*—Matthew Nguyen
*Attorney, Agent, or Firm*—Foley & Lardner

[57] ABSTRACT

A current stiff power conversion system, such as a rectifier, inverter, or AC-to-AC converter is provided wherein power converter switching devices in the power conversion system may be switched at or near zero voltage conditions to minimize or eliminate switching losses and increase switching frequencies. Zero voltage switching conditions are achieved by providing a snubber capacitor across each switching device in the power conversion system, and connecting an active commutation unit, including an inductor and an active commutation unit switching device connected in series across DC bus lines in parallel with the bridge of power conversion switching devices. Zero voltage switching conditions for the power conversion switching devices are achieved by controlling the power conversion switching devices and the active commutation unit to establish a resonance between the snubber capacitors and the active commutation unit to drive the voltage across incoming switching devices in the power conversion system to at or near zero. Zero current switching of the active commutation unit switching device, and reduced switching device stress in the power conversion system, is achieved by controlling the power conversion switching devices to establish zero current switching conditions and a desired snubber driving voltage for the active commutation unit before the active commutation unit is turned on to establish the resonance condition. Since zero voltage switching conditions for the power conversion switching devices is achieved each switching cycle, the power conversion system may be controlled using a PWM control scheme.

25 Claims, 28 Drawing Sheets

U.S. PATENT DOCUMENTS

| | | |
|---|---|---|
| 4,697,219 | 9/1987 | Mitsuoka . |
| 4,730,242 | 3/1988 | Divan . |
| 4,757,435 | 7/1988 | Wood et al. . |
| 4,833,584 | 5/1989 | Divan . |
| 4,942,511 | 7/1990 | Lipo et al. . |
| 4,965,709 | 10/1990 | Ngo ............................................ 363/37 |
| 5,027,264 | 6/1991 | DeDoncker et al. . |
| 5,412,557 | 5/1995 | Lauw ......................................... 363/37 |
| 5,432,695 | 7/1995 | Vlatkovic et al. . |
| 5,483,140 | 1/1996 | Hess et al. . |
| 5,642,273 | 6/1997 | Lai et al. .................................. 363/56 |
| 5,710,698 | 1/1998 | Lai et al. .................................. 363/56 |
| 5,793,622 | 8/1998 | Dahler et al. . |

OTHER PUBLICATIONS

B. Wu., S.B. Dewan, G.R. Slemon. "PWM–CSI inverter for induction motor drives", IEEE Trans. Ind. Applic., vol. 28, No. 1, Jan./Feb. 1992, pp. 64–71.

F. Leonardi, et al., "Soft–Switched PWM Converter with Inductive DC Filter", IEEE PCC '93 Conf. Record, Yokohama, 1993, pp. 123–128.

William McMurray, "Resonant Snubbers with Auxiliary Switches", IEEE Trans. Ind. App., vol. 29, No. 2, Mar./Apr., 1993, pp. 355–361.

Vlatko Vlatkovic, et al., "Soft–Transition Three–Phase PWM Conversion Technology", IEEE PESC '94, 1994, pp. 79–84.

J.R. Espinoza, G. Joos, "A current–source inverter fed induction motor drive system with reduced losses", IEEE IAS '95 Conf. Records, Orlando, 1995, pp. 45–51.

Steven C. Rizzo, et al., "Symmetric GTO and Snubber Component Characterization in PWM Current Source Inverters", IEEE APEC '96, 1996, pp. 613–619.

M.L. Gasperi, "Life prediction model for aluminum electrolytic capacitors", IEEE IAS '96 Conf. Records, San Diego, 1996, pp. 1347–1351.

Y. Xiao, B. Wu, S. Rizzo, R. Sotudeh, "A novel power factor control scheme for high power GTO current source converter", IEEE IAS '96 Conf. Record, San Diego, 1996, pp. 865–869.

B. J. Cardoso Filho, T.A. Lipo, "Space vector control and modulation issues in the passively clamped quasi–resonant inverter", IEEE IAS Annual Meeting Conf. Records, San Diego, 1996, pp. 1179–1185.

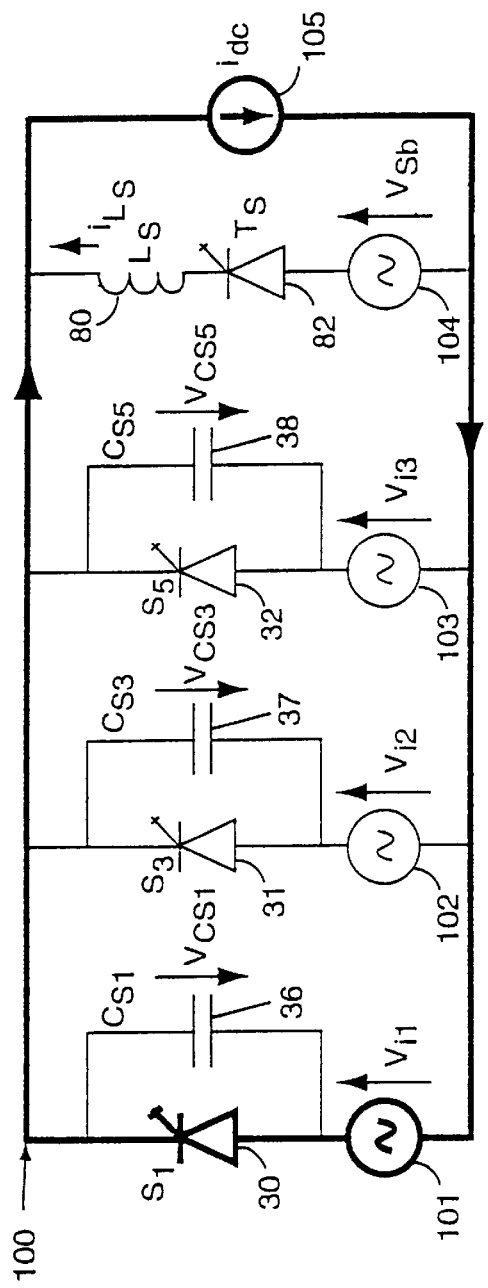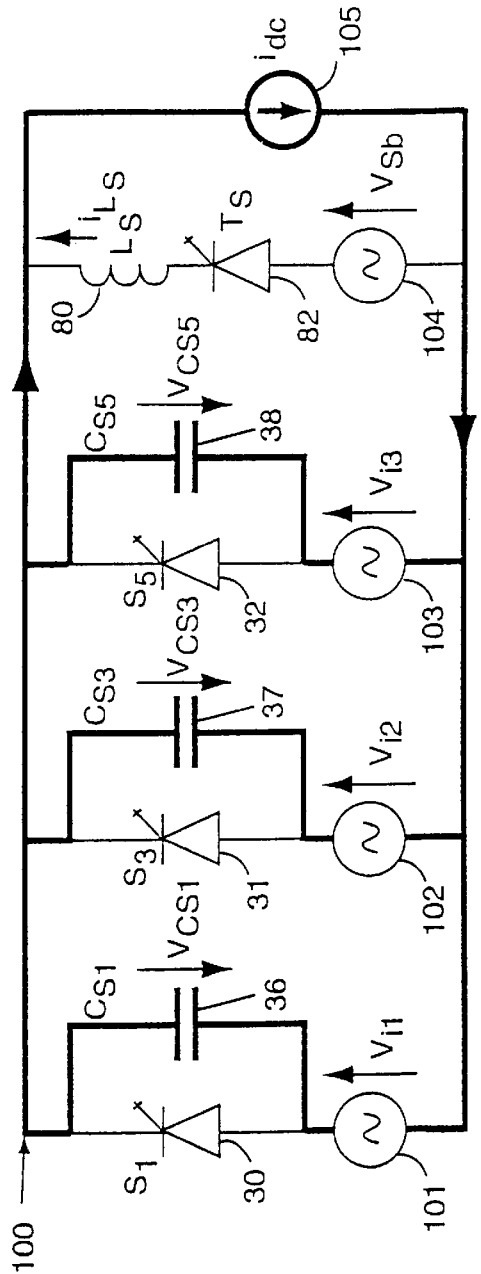
FIG. 3(a) MODE 1
FIG. 3(b) MODE 2

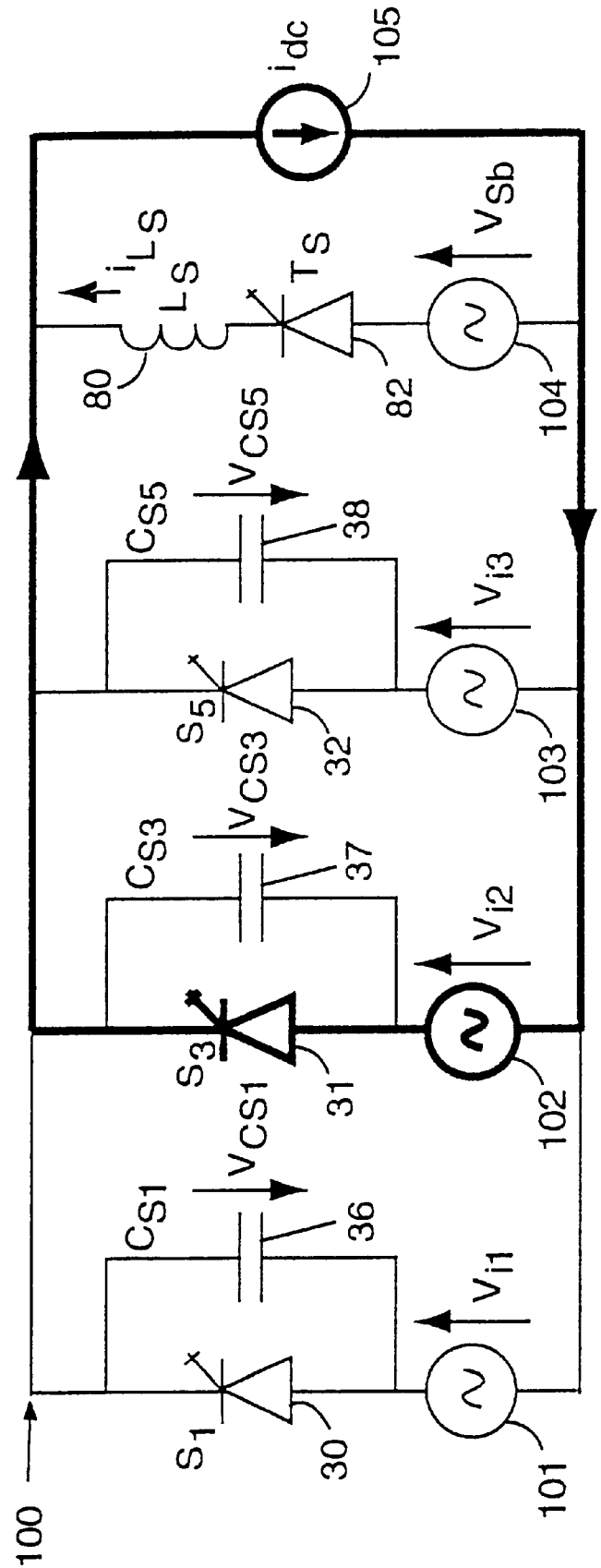
FIG. 3(C) MODE 3

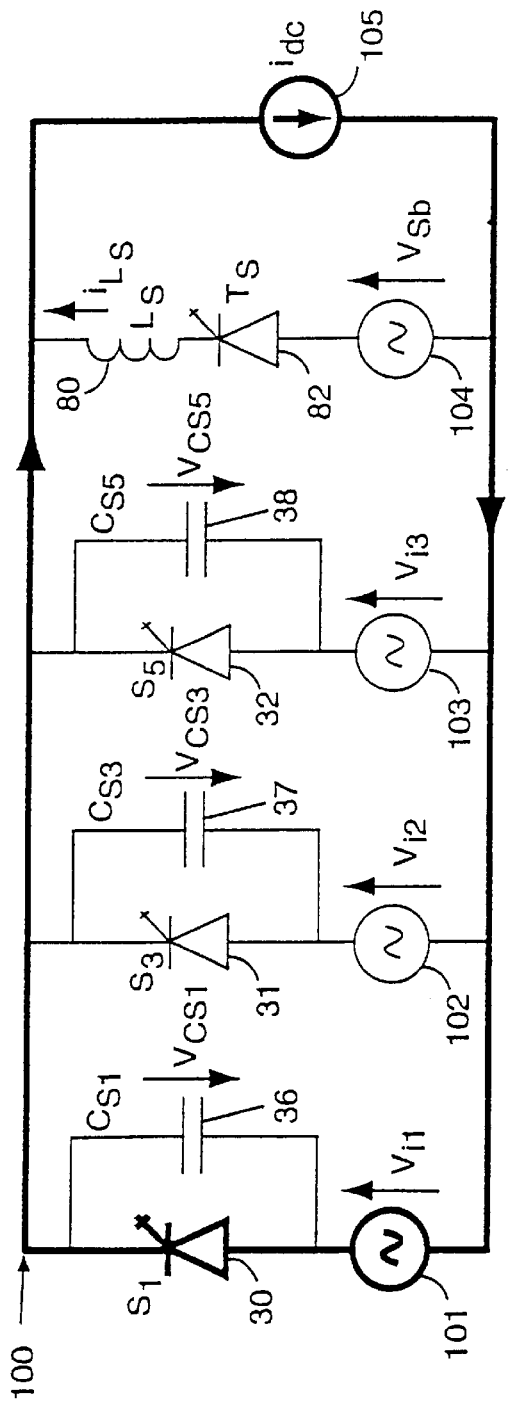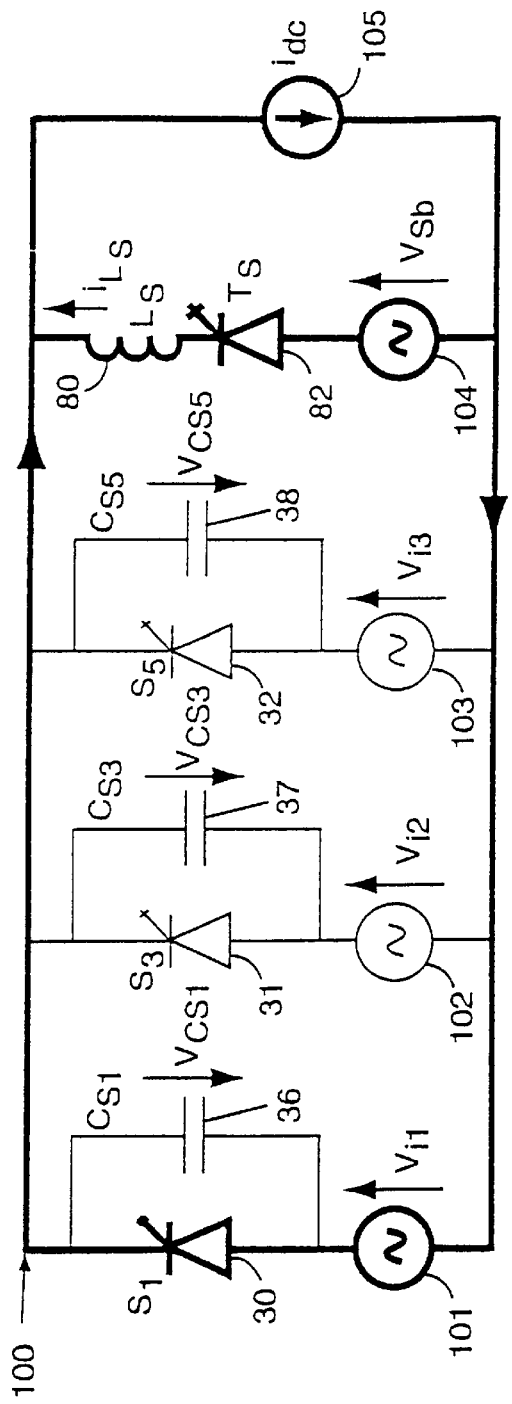
FIG. 4(a) MODE 1
FIG. 4(b) MODE 2

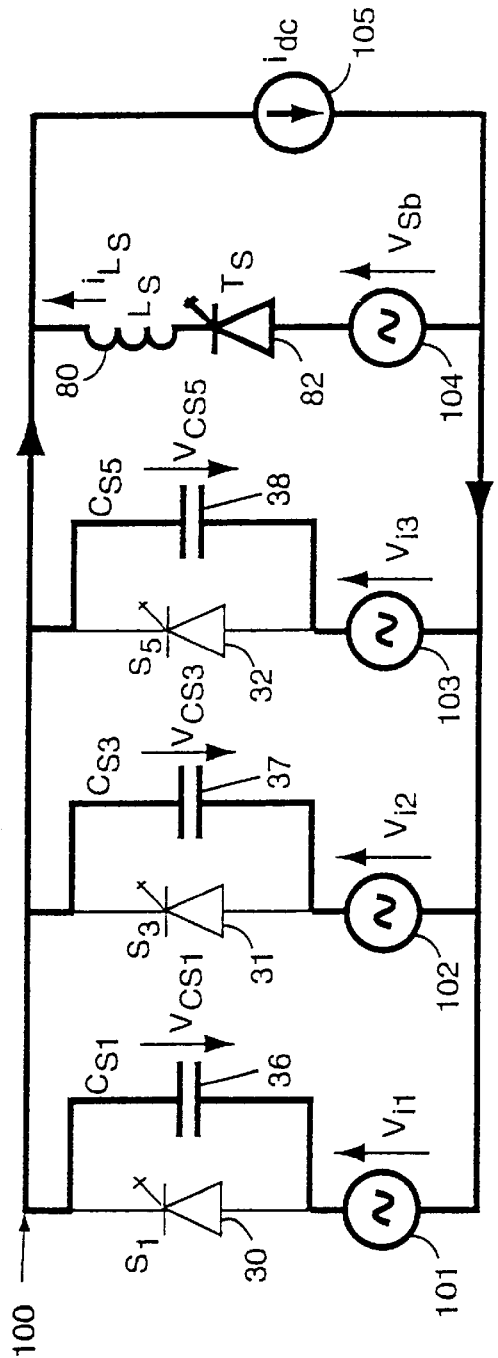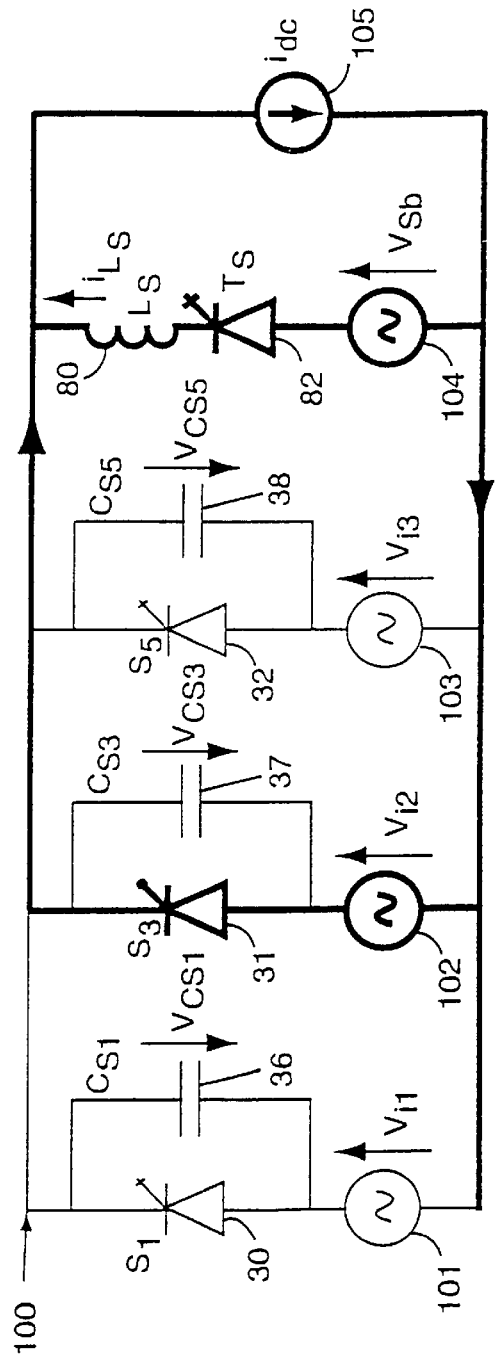
FIG. 4(c) MODE 3
FIG. 4(d) MODE 4

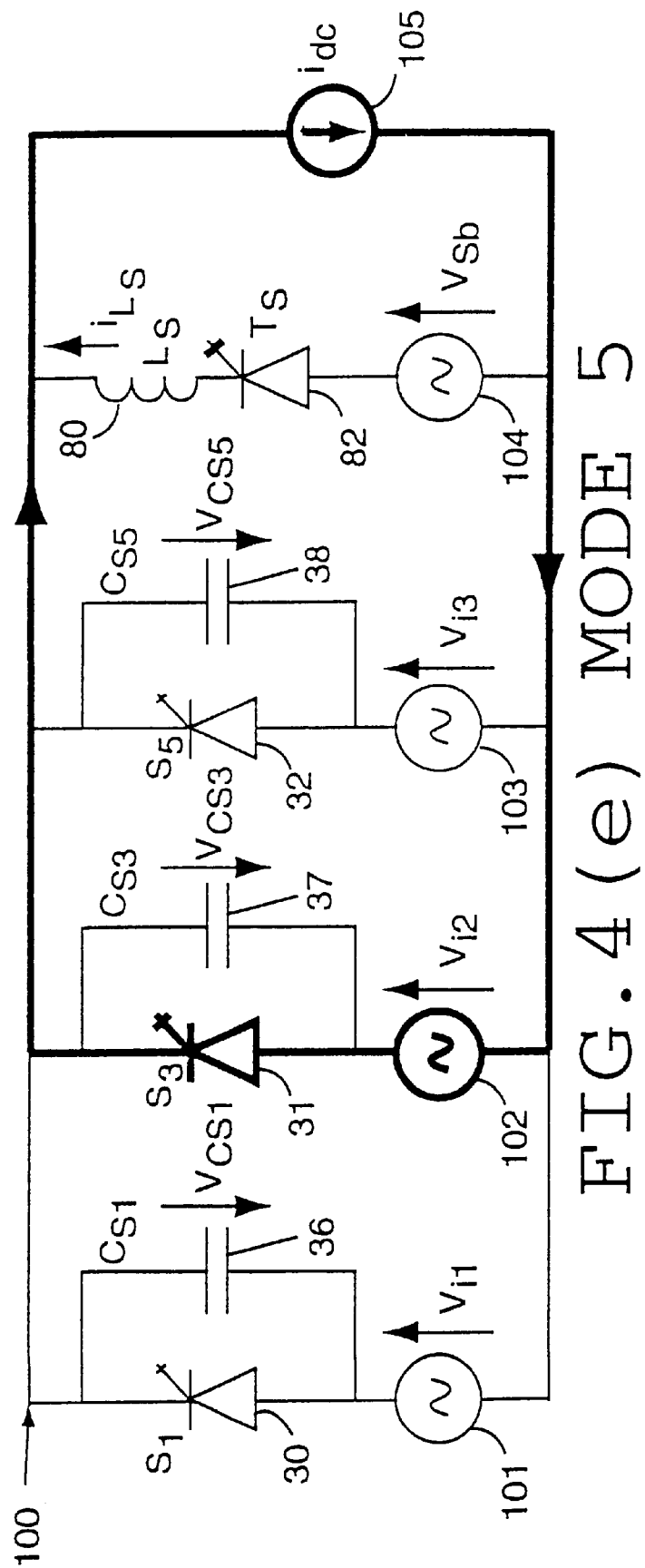
FIG. 4(e) MODE 5

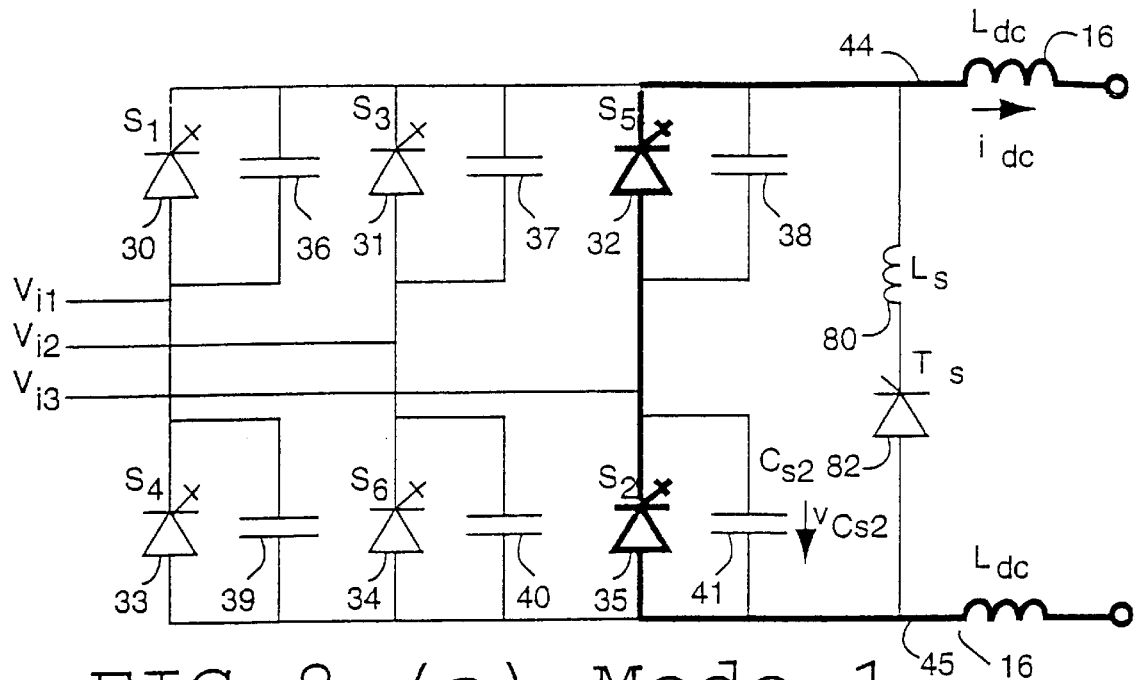
FIG. 8 (a) Mode 1
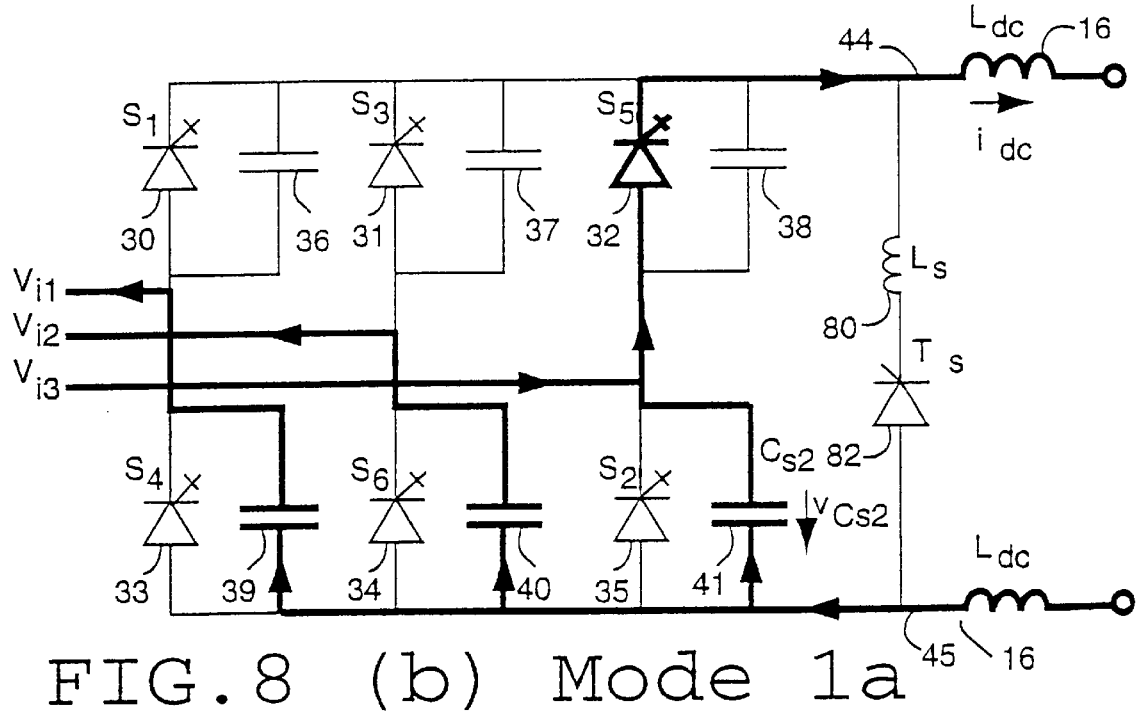
FIG. 8 (b) Mode 1a

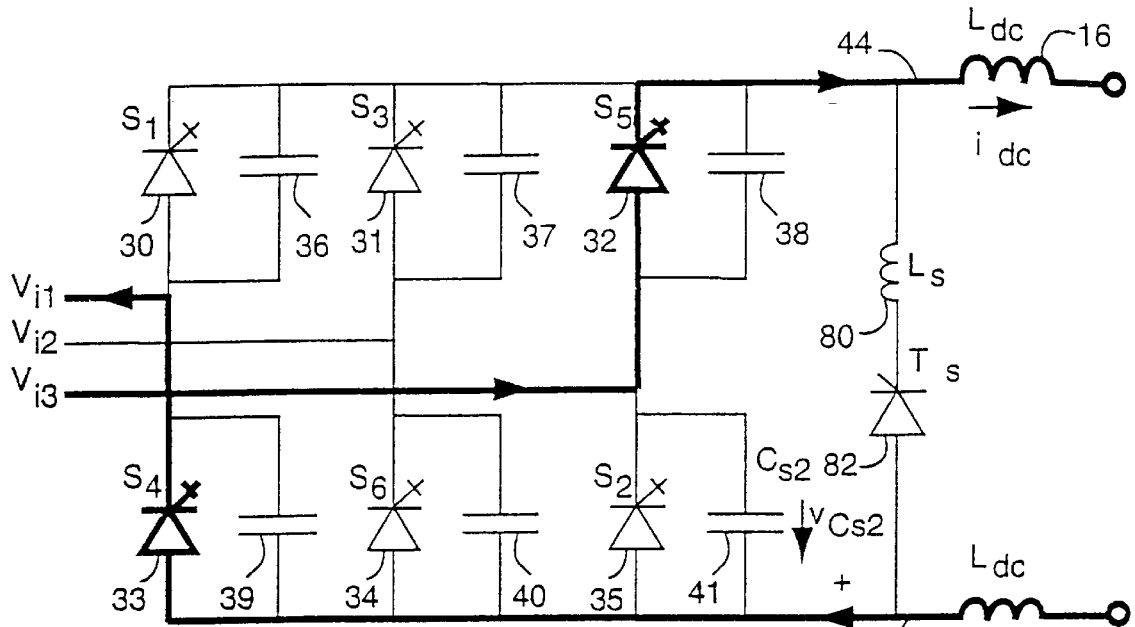
FIG. 8 (c) Mode 1b
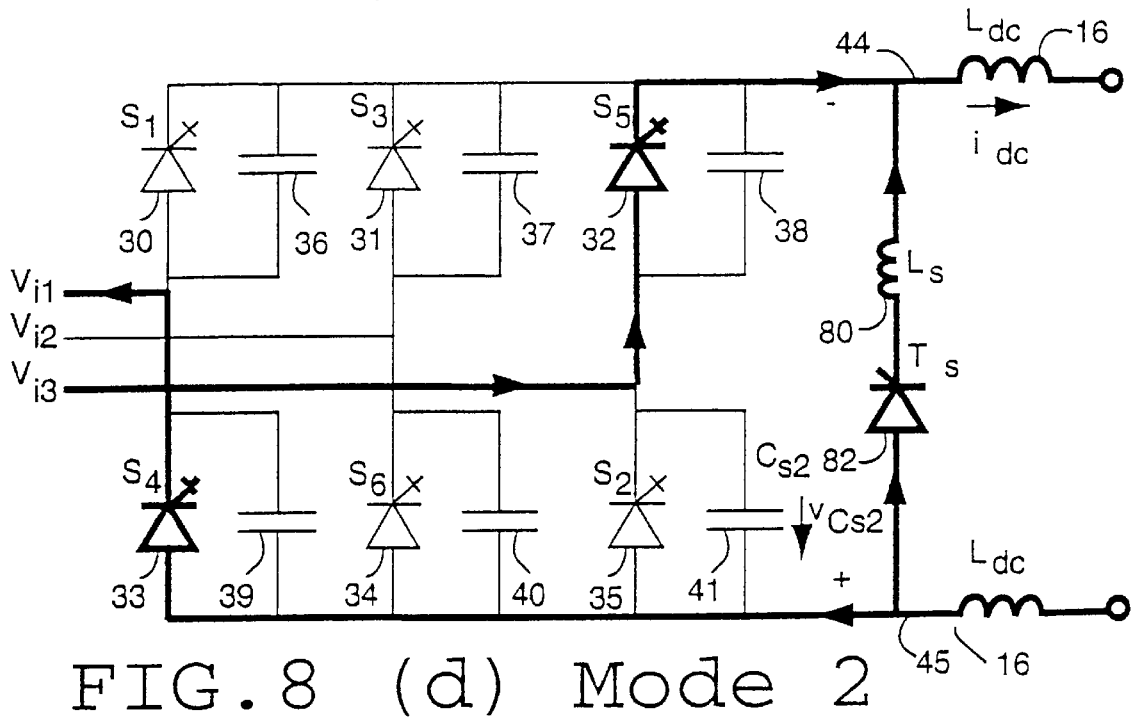
FIG. 8 (d) Mode 2

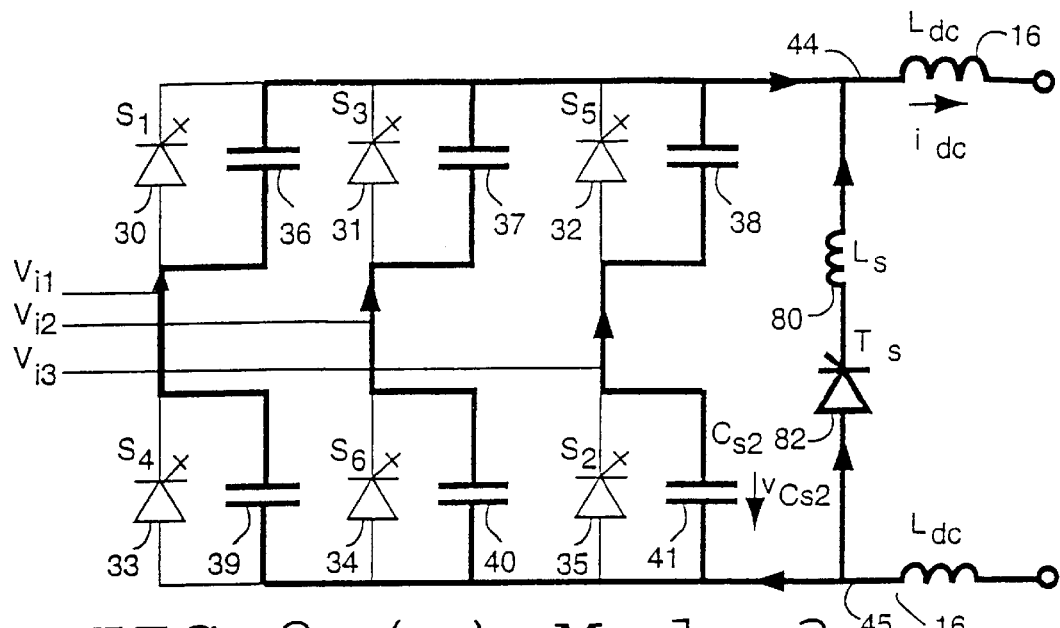
FIG. 8 (e) Mode 3
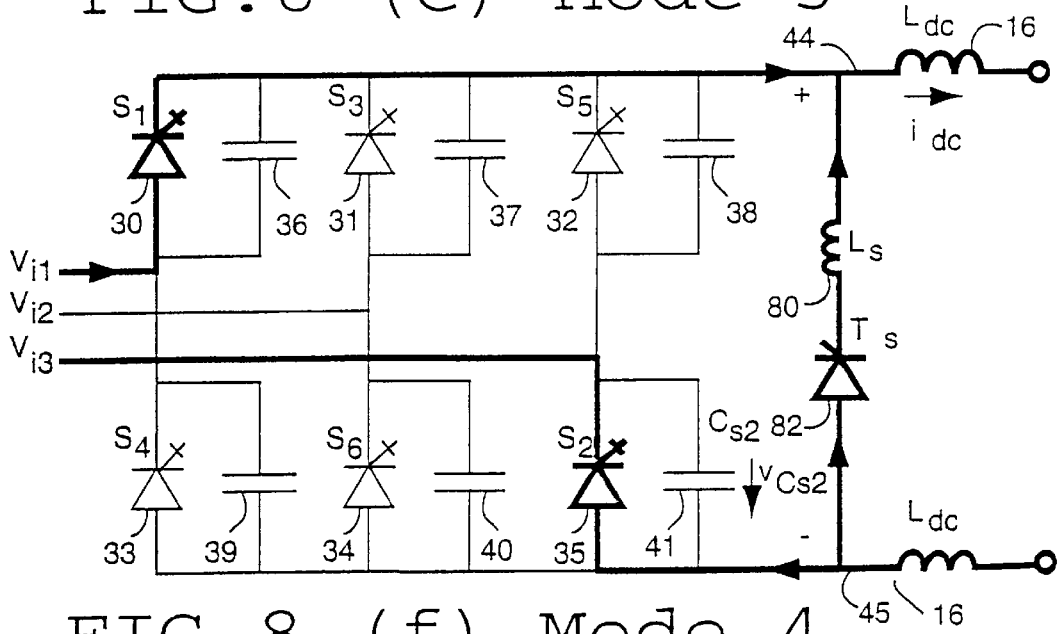
FIG. 8 (f) Mode 4

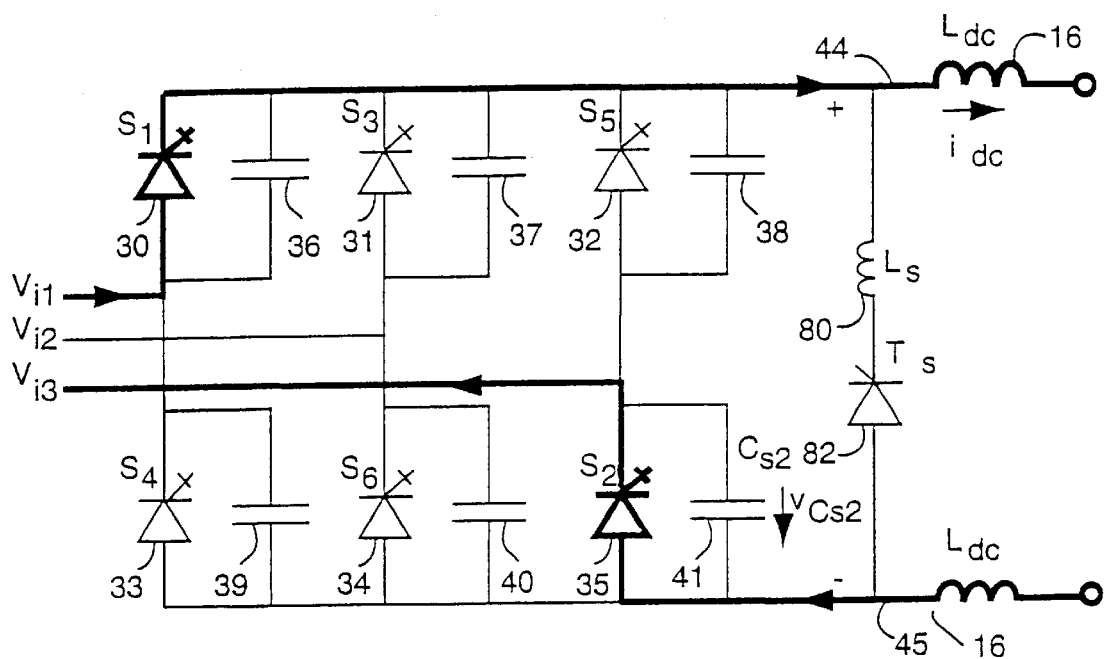
FIG. 8 (g) Mode 5

5,949,664

CURRENT STIFF CONVERTERS WITH RESONANT SNUBBERS

This application claims the benefit of U.S. Provisional Application Number 60/050,205 filed Jun. 19, 1997.

This invention was made with United States government support awarded by the following agencies: ONR Grant #N00014-95-1-1128. The United States has certain rights in this invention.

FIELD OF THE INVENTION

The present invention relates to the field of power converters and systems for the control of power converters.

BACKGROUND OF THE INVENTION

Electrical power converter systems are used to convert fixed frequency alternating current (AC) power to variable frequency, variable amplitude power. Such systems typically include a rectifier for converting AC power to direct current (DC) power and an inverter for converting the DC power to variable frequency, variable amplitude AC power. Frequently, a DC link transfers power from the rectifier to the inverter. The DC link may be merely an inductive coupler for transiently isolating the rectifier from the inverter. The output AC power from the inverter may be pulse width modulated (PWM) or controlled by some other means to establish the desired output power level.

Inverters may be of the current stiff type or the voltage stiff type. The voltage stiff inverter is typically used in applications requiring low to medium power, generally up to 1 MW. For example, a voltage stiff inverter using PWM is used in motor drive applications as well as in voltage regulated frequency changer applications. Current stiff converters are typically used for high power applications. Typical of these applications are motors which drive rolling mills, such as those found in steel and aluminum plants, and the motors which drive the large fans and pumps used by utilities.

Switching losses in electrical power converters are related to the switching frequency of the converters. By increasing the converter switching frequency, the size and weight of the converters can be decreased because the passive components such as inductors and capacitors can be made smaller. However, the higher switching frequency will increase the losses of the switching devices.

In the past few years, various power circuit topologies have been studied in an attempt to achieve soft switching (i.e., switching at zero voltages or zero currents) in high power converters. Soft switching operation of the power devices can significantly reduce switching losses and therefore allow operation of the converter at significantly higher switching frequencies.

Various circuit topologies have been used successfully to achieve soft switching. For example, a resonant DC link circuit (as described in U.S. Pat. No. 4,730,242, entitled "Static Power Conversion Method and Apparatus Having Essentially Zero Switching Losses") employs a resonant circuit composed of an inductor and a capacitor connected to the DC power supply and the DC bus. The LC resonant circuit is excited in such a way as to set up periodic oscillation on the inverter DC line. Under appropriate control, the DC link voltage can be made to go to zero for a controlled period of time during each cycle. During the time that the DC link voltage goes to zero, the devices across the DC link can be turned on and off in a lossless manner. By eliminating device switching losses, inverter switching frequencies can be raised to above 50 kHz at power ratings of 100 kW using commercially available switching devices such as IGBTs. However, a disadvantage to such resonant DC link circuits is that the inverter switches are required to change state synchronously with the resonating DC bus. This requires discrete pulse modulation (DPM) which precludes achieving PWM control of each phase, thus resulting in sub-harmonics and a more crudely formed sine wave at the output.

SUMMARY OF THE INVENTION

A current stiff converter with resonant snubbers controlled in accordance with the present invention combines the advantages of soft switching, which minimizes switching losses, and pulse width modulation, which simplifies control and allows the generation of improved sine waves with minimal extra voltage and current stress on the converter switches and snubber components. The current stiff converter of the present invention can be used both as a rectifier and as an inverter in high power applications. The current stiff converter with resonant snubbers achieves a substantial reduction of the switching losses of a PWM controlled converter as well as a reduction in total losses. Because the soft switching reduces losses, an increase of the switching frequency is possible with an associated decrease of the inductance of the inductor in the intermediate circuit and a corresponding reduction of the size and expense of AC filter components.

In accordance with the present invention, special pulse patterns are used to drive the converter switches. The addition of resonant snubbers to each of the current stiff rectifier and the current stiff inverter which form the converter enables soft switching of the whole converter. Each resonant snubber unit is comprised of snubber capacitors and one or more active commutation units. Each active commutation unit is formed by a snubber inductor series connected to an active commutation switching device (e.g., a switch such as a thyristor). The current rating of the snubber inductor and switch is significantly lower than that of the main components in the converter, e.g., the rectifier and inverter switching devices and the inductor in the intermediate circuit between them. The active commutation unit may be activated once per period T of the switching frequency. Separate or simultaneous commutation in the upper and lower halves of the bridges of the current stiff converter may be realized depending upon the resonant snubber design adapted. The special pulse patterns applied to the converter switching devices in combination with activation of the commutation units enables zero voltage switching of the rectifier and/or inverter switches and zero current switching of the snubber switch.

A three phase machine, such as an induction motor or a synchronous machine, driven by a converter in accordance with the present invention, will experience inherently decreased losses. The higher switching frequency of a converter in accordance with the present invention enables an increase in the power density of the converter and a reduction in the cost of the converter passive components. Heat sinks, capacitors and inductors can be reduced in size.

Further objects, features and advantages of the invention will be apparent from the following detailed description when taken in conjunction with the accompanying drawings.

BRIEF DESCRIPTION OF THE DRAWINGS

In the drawings:

FIG. 3 illustrates the modes of operation of the simplified current stiff converter circuit of FIG. 2 for an exemplary passive commutation sequence.

FIG. 4 illustrates the modes of operation of the simplified current stiff converter circuit of FIG. 2 for an exemplary active commutation sequence.

FIG. 8 illustrates the modes of operation of the exemplary current stiff rectifier front end of FIG. 6 for an exemplary active commutation sequence.

FIGS. 13 to 21 are waveform diagrams illustrating the operation of an exemplary current stiff rectifier front end with resonant snubbers controlled in accordance with the present invention, wherein FIG. 13 illustrates current and voltage at the AC terminals in the rectifier mode; FIG. 14 illustrates in detail active commutation waveforms in the rectifier mode; FIG. 15 illustrates voltage stress on the main switching devices in the rectifier mode; FIG. 16 illustrates current and voltage at the AC terminals in the inverter mode with cosΦ=0.9; FIG. 17 illustrates in detail active commutation waveforms in the inverter mode with cosΦ=0.9; FIG. 18 illustrates voltage stress on the main devices in the inverter mode with cosΦ=0.9; FIG. 19 illustrates current and voltage waveforms at the AC terminals in inverter mode with cosΦ=0.5; FIG. 20 illustrates in detail active commutation waveforms in the inverter mode with cosΦ=0.5; and FIG. 21 illustrates voltage stress on the main switching devices in the inverter mode with cosΦ=0.5.

DETAILED DESCRIPTION OF THE INVENTION

Figure 1A:
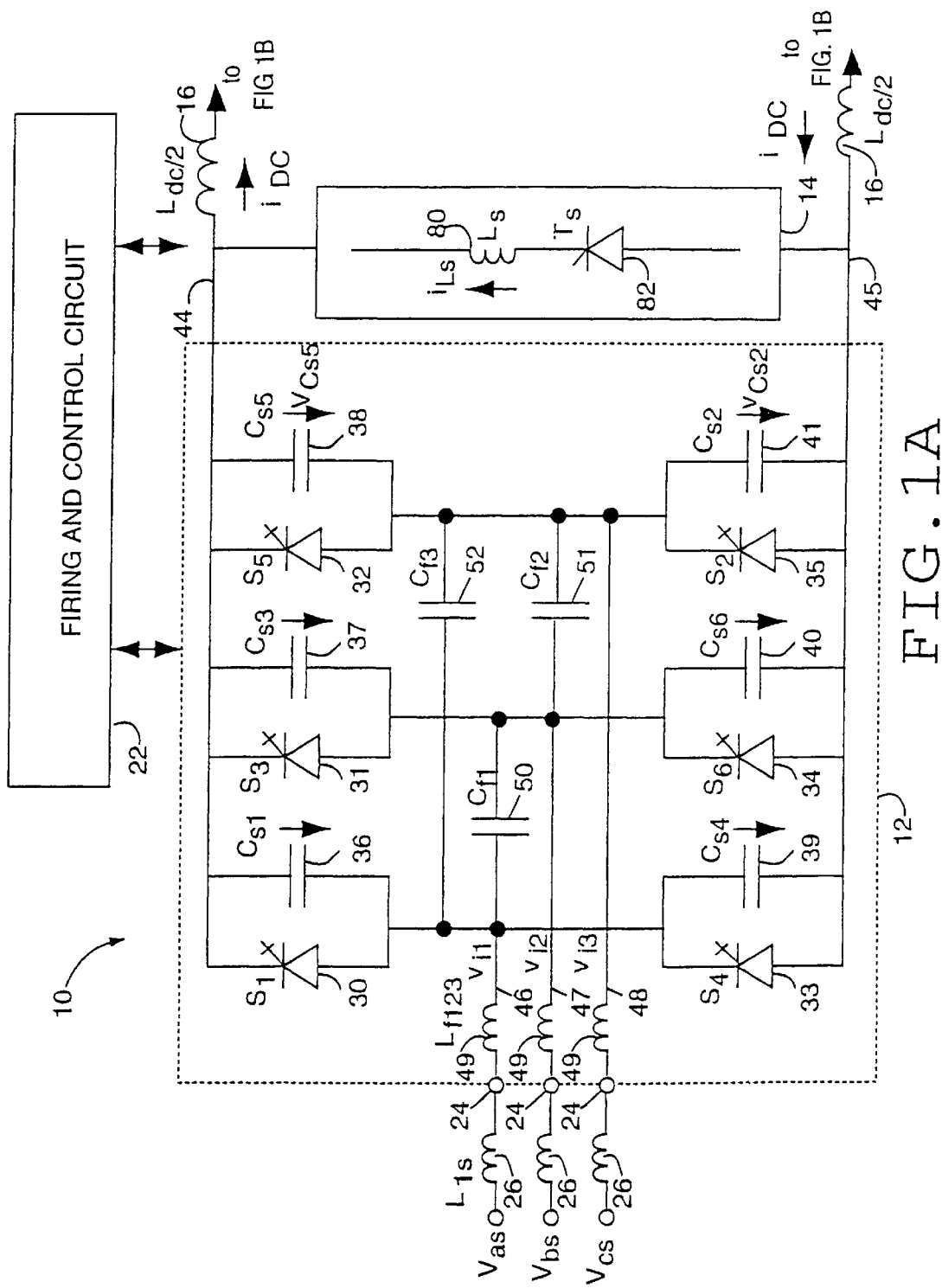
FIG. 1 is a schematic circuit diagram of an exemplary current stiff power conversion system with resonant snubbers in accordance with the present invention.
Figure 1B:
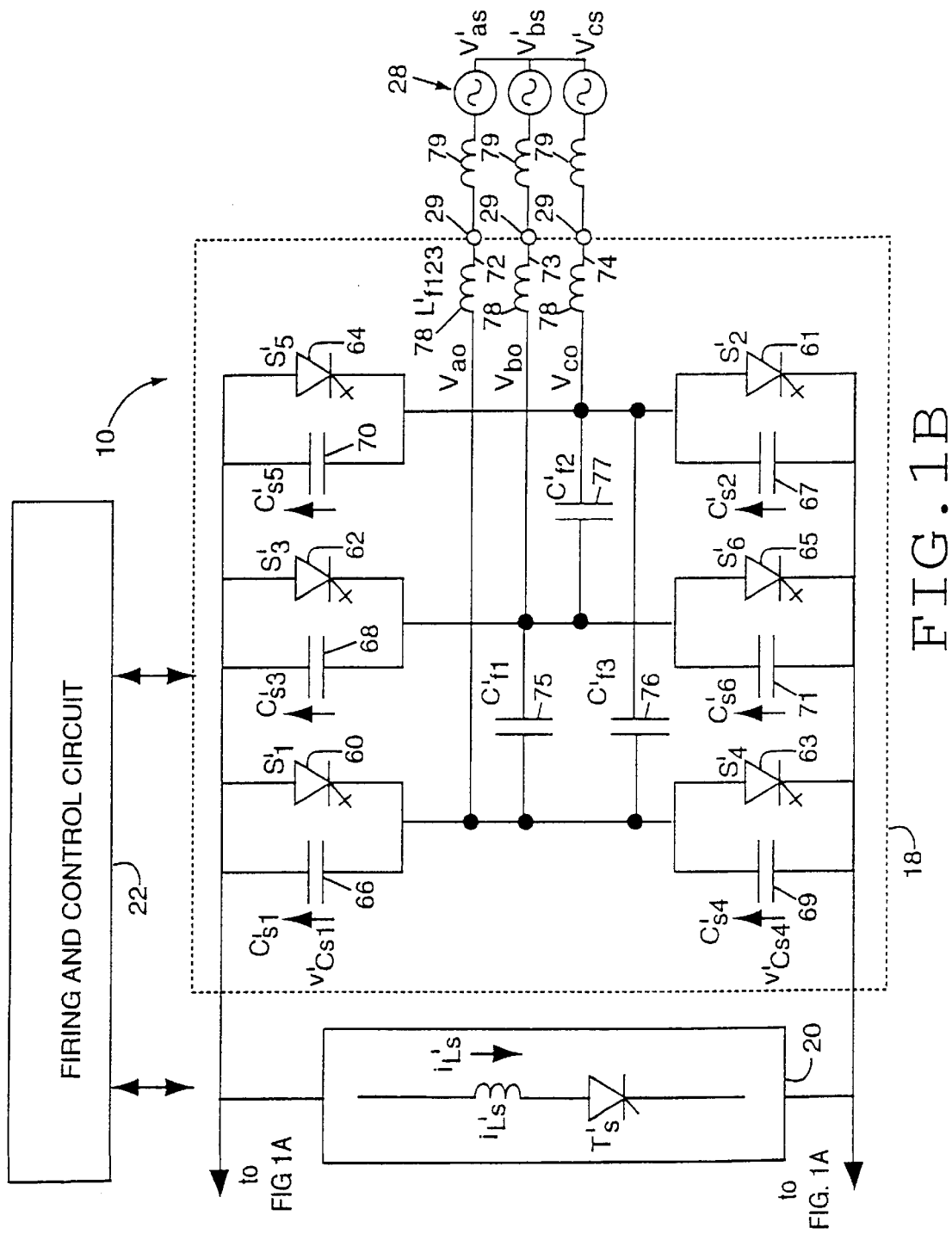

Referring now to FIG. 1, an exemplary current stiff power conversion system in accordance with the present invention is shown generally at 10. The power conversion system 10 is adapted to provide controllable power from a source to a three phase load. The power conversion system includes a rectifier front end 12, a set of one or more active commutation units 14 of the current stiff rectifier, a DC link inductor 16, a current stiff inverter 18, a set of one or more active commutation units 20 of the current stiff inverter, and a firing and control circuit 22.

Inductance associated with the power source, e.g., a three phase commercial power system providing three phase power to input terminals 24 of the power conversion system 10 is represented by the inductors 26 in each of the three phase input lines. Each inductor 26 has inductance $L_{dc}$. The flow of power in the system 10 is reversible so that power may flow back from the three phase load, indicated generally at 28, connected to output terminals 29 of the system 10, to the input terminals 24 when the load 28 acts as a source.

Figure 22:
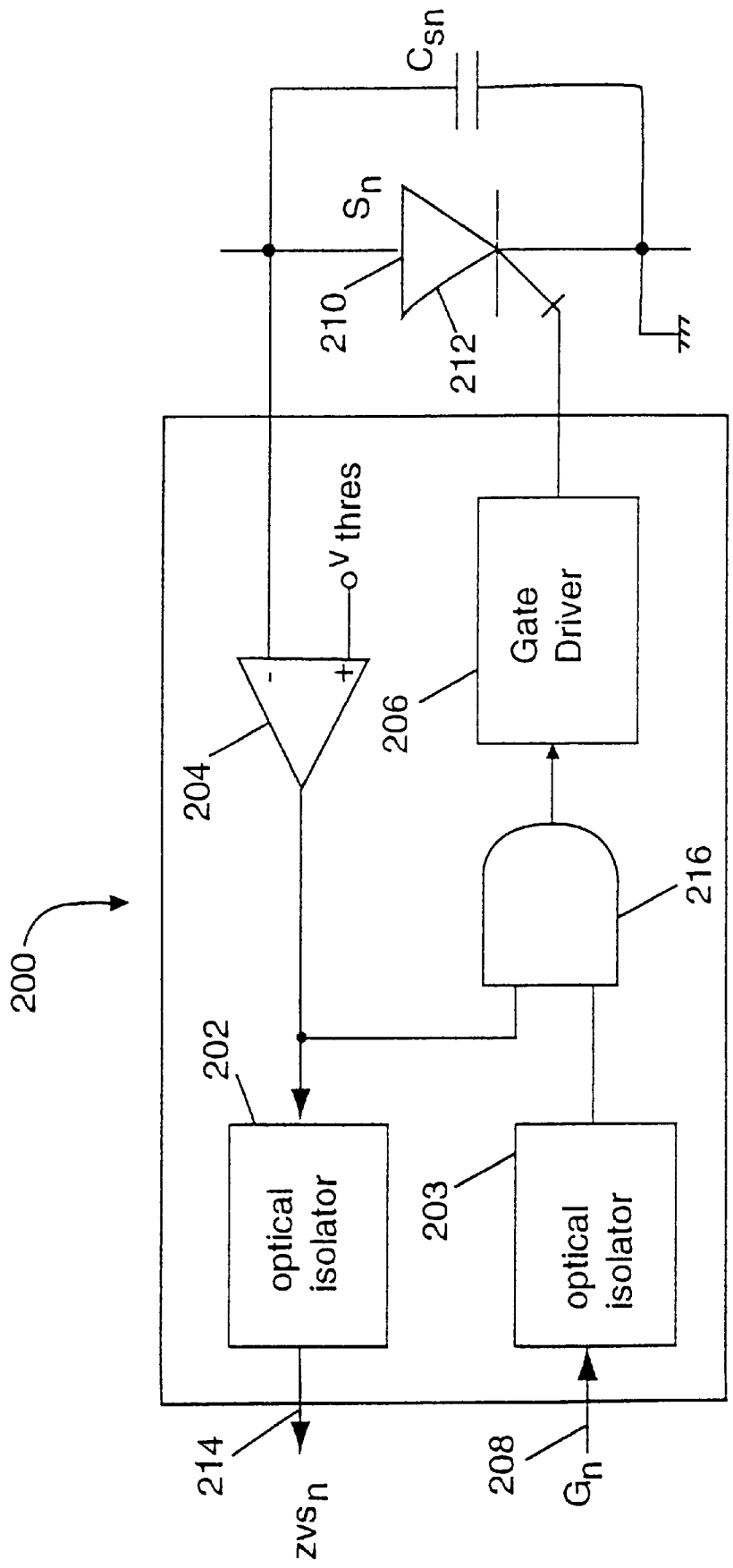
FIG. 22 is a circuit diagram of an exemplary gate drive circuit which may be employed in a current stiff converter circuit in accordance with the present invention.

As illustrated in FIG. 1, the rectifier 12 may be formed of a full bridge of controlled rectifier or switching devices 30–35, which may be implemented as gate-turn-off thyristors (GTOs), designated in FIG. 1 as switching devices $S_1$ through $S_6$. Faster modern devices, such as MTOs and series connected HVIGBTSs and power diodes, may also be used to implement the controlled rectifier or switching devices 30–35. Each of the switching devices $S_1$–$S_6$ includes a corresponding parallel connected snubber capacitor 36–41, designated as $C_{S1}$–$C_{S6}$ in FIG. 1. A gate drive circuit connected to the firing and control circuit 22 is also connected to each switching device $S_1$–$S_6$. For simplicity, the gate drive circuits are not shown in FIG. 1. (A suitable exemplary gate drive circuit 200 is illustrated in FIG. 22 and described in more detail below.)

The switching devices 30–35 in the rectifier bridge are arranged as three sets of two series connected switching devices, i.e., the sets $S_1$ and $S_4$, $S_2$ and $S_5$, and $S_3$ and $S_6$, forming three legs of the rectifier 12. The two switching devices in each leg are connected together in series across DC bus lines 44 and 45. The rectifier 12 receives input power on the three input lines 46, 47, and 48. Filter inductors 49, with equal inductance values $L_{F123}$, are provided on each input line 46, 47, and 48. Each input line is connected to a node between the switching devices in a respective one of the rectifier legs. The voltages on lines 46, 47, and 48 are designated as $v_{i1}$, $v_{i2}$ and $v_{i3}$ respectively. Three capacitors, 50, 51, and 52, designated $C_{dc}$, $C_{dc}$, and $C_{dc}$ respectively, are connected in a delta or Y connection across the three phase input lines 46, 47 and 48. The inductors 49, in association with the capacitors 50–52, form an input filter. The switching devices 30–35 of the rectifier 12 are controlled to provide a rectified DC output current on the DC bus lines 44 and 45 from the three phase AC signal on input lines 46–48.

The DC link inductor 16 is connected in the DC bus line 44 between the rectifier 12 and the inverter 18. (The DC link inductance $L_{dc}$ may be divided between two link inductors 16, one on each DC bus line 44 and 45, as illustrated in FIG. 1.) The DC bus current through inductor 16 is designated as $i_{DC}$.

The inverter 18 is composed of a full bridge of six gate controlled switching devices 60–65, for example, GTOs, designated in FIG. 1 as $S^{1'}$ through $S^{6'}$. The switching devices 60–65 are arranged in three sets of two series connected switching devices, i.e., the sets $S_1'$ and $S_4'$, $S_3'$ and $S_6'$, and $S_5'$ and $S_2'$ to form three legs of the inverter 18. Each of the switching devices 60–65 includes a corresponding paralleled snubber capacitor 66–71, designated as $C_{S1}'$–$C_{S6}'$, and a corresponding gate drive circuit (not shown in FIG. 1). The two switching devices in each leg are connected in series across the DC bus lines 44 and 45. Each switching device 30–35 and 60–65 shown in FIG. 1 may, of course, constitute plural parallel or series connected devices to handle higher currents, or voltages, as is conventional.

The inverter 18 has three output lines 72, 73, and 74 on which the three phase output voltages, $v_{ao}$, $v_{bo}$ and $v_{co}$, respectively, are generated and applied to the load 28. Each output line 72–74 is connected to the node connecting the inverter switching device in one of the inverter legs. Three capacitors 75–77, designated $C_{dc}'$, $C_{dc}$, and $C_{dc}'$, are connected in a delta connection across the three phase output lines 72, 73, and 74. The three capacitors 75–77, may also be connected in an equivalent Y configuration. Inductors 78, with inductance values $L_{F123}'$, may be included in the output lines to form, in combination with capacitors 75–77, an output filter. Inductors 79 represent the inductance of the load on each of output lines 72–74.

As shown in FIG. 1, the active commutation units 14 and 20 each include an inductor and a switching device, such as a thyristor, connected in series. The commutation units 14 and 20 are connected across the converter DC bus lines 44 and 45. The commutation unit 14 includes an inductor 80 (having an inductance $L_S$), connected in series with a switching device 82, designated $T_S$. Commutation unit 20 includes an inductor (having an inductance $L_S'$) connected in series with a switching device 86, designated $T_S'$.

The switching of the switching devices ($S_1$–$S_6$, $S_1'$–$S_6'$ and $T_S$ and $T_{S2}'$) of the converter system 10 is controlled by the firing and control circuit 22. In general, the firing and control circuit 22 provides PWM firing signals to the gate drive circuits of the rectifier switching devices $S_1$–$S_6$ and the inverter switching devices $S_1'$–$S_6'$, and to the switching devices $T_S$ and $T_S'$ of the commutation units 14 and 20. Special pulse patterns allow the switching devices $S_1$–$S_6$ in the rectifier 12 and the switching devices $S_1'$–$S_6'$ in the inverter 18 to operate generally as zero voltage switches. The switching devices $T_S$ and $T_S'$ in the commutation units 14 and 20 are controlled to operate as zero current switches.

The firing and control circuit 22 is composed of two main circuits: a rectifier firing and control circuit and an inverter firing and control circuit. These two circuits are quite similar in terms of their hardware and software requirements, since four quadrant operation is inherent to current stiff converters. The main difference lies in the converter variables controlled by each one of the circuits. The rectifier firing and control circuit is used to control the amplitude of the converter DC link current and perform utility interface tasks, such as control of the input power factor and minimization of current harmonic injection in the utility system. The inverter firing and control circuit is used to create the desired supply conditions for the converter load, supplying power at variable current amplitude and variable frequency.

Operation of the exemplary power conversion system 10 in accordance with the present invention will be described initially with reference to the simplified current stiff converter circuit 100 illustrated in FIG. 2. The simplified schematic circuit 100 shows a generalized representation of the realization of resonant snubbers in a current stiff converter circuit topology. The generalized realization preserves all the basic characteristics of the resonant snubber concept. For exemplary purposes only, the components of the simplified circuit 100 are labeled so as to correspond to the component in the upper half of the bridge of switching devices in the rectifier 12 of the power conversion circuit 10 of FIG. 1, i.e., the common-cathode group of switching devices in the three phase rectifier 12. Thus, the simplified circuit 100 includes three inverter legs, wherein each inverter leg includes a switching device 30–32 ($S_1$, $S_3$, or $S_5$) connected in parallel with a snubber capacitor 36–38 ($C_{S1}$, $C_{S3}$ or $C_{S5}$). A voltage source 101–103 connected in each leg of the circuit 100 represents the input voltage signals $V_{i1}$–$V_{i3}$ on input lines 46–48 of the rectifier 12. An active commutation unit, including series connected inductor 80 ($L_S$) and commutation unit switching device 82 ($T_S$) is connected in parallel with the inverter legs. A voltage source 104 connected in series with the active commutation unit components represents the snubber driving voltage $v_{Sb}$. Current source 105, connected in parallel with the rectifier legs and snubber active commutation unit, represents the DC bus current $i_{dc}$ in the power conversion circuit.

Figure 2:
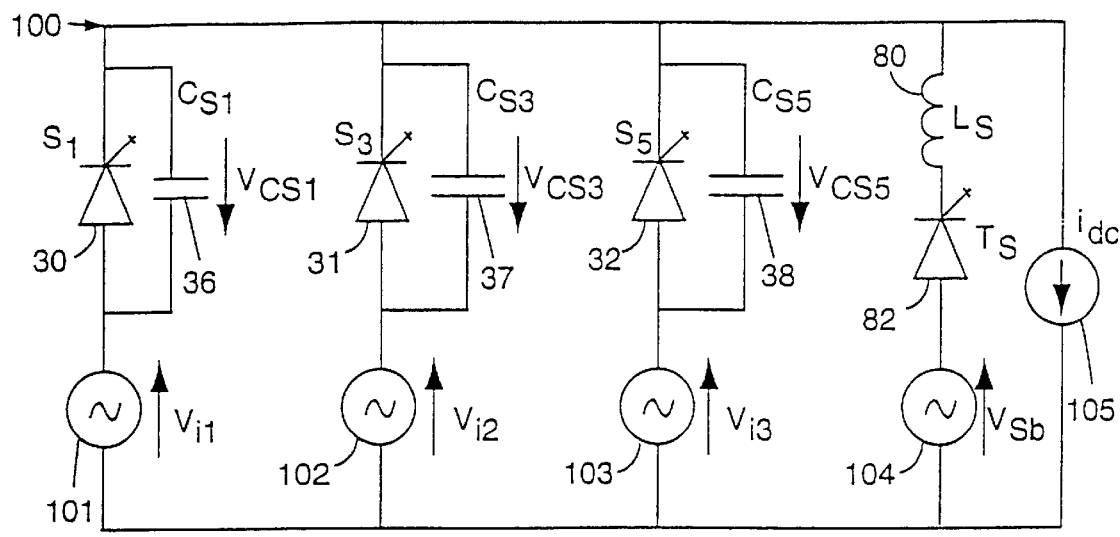
FIG. 2 is a schematic circuit design of a simplified current stiff converter circuit with resonant snubbers used to explain operation of a power conversion system in accordance with the present invention.

The simplified current stiff converter circuit 100 of FIG. 2 is generic in terms of the additional degree of freedom that corresponds to the snubber driving voltage $v_{Sb}$. It should be apparent that the generalized current stiff converter circuit 100 could also represent the upper half of the switching device bridge in the inverter 18 of the power conversion circuit 10 of FIG. 1, i.e., the common-anode group of switching devices in the inverter 18. Furthermore, it should be apparent generalized current stiff converters which are analogous to the circuit 100 can be obtained for the complimentary switching device groups of the power conversion circuit 10 of FIG. 1, i.e., the switching devices in the lower half of the rectifier bridge (the common-anode group of switching devices in the three-phase rectifier 12) or the switching devices in the lower half of the inverter bridge (the common-cathode group of switching devices of the three-phase inverter 18).

In the representation of the generalized current stiff converter circuit 100 only one active commutation unit snubber branch is included for the sake of clarity. If multiple active commutation unit snubber branches are present in a particular power conversion system realization in accordance with the present invention, the equivalent circuit 100 of FIG. 2 can still be used as long as the proper considerations are made.

The generalized current stiff converter circuit 100 will be used to describe the control of the switching devices in a power conversion system in accordance with the present invention under two possible commutation sequences, a passive commutation sequence, and an active commutation sequence. The passive commutation sequence will be described first.

Without loss of generality, assume that a commutation process is taking place from switching device $S_1$ to switching device $S_3$, i.e., switching device $S_1$ is turned on and is to be turned off, and switching device $S_3$ is turned off and is to be turned on, and the rectifier terminal voltages are such that $v_{i1} > v_{i2}$. Under these conditions, the incoming switching device $S_3$ is reverse biased. This situation is defined in classical terms as forced commutation, since the turn off of the switching device $S_1$ can only be achieved by either external commutation circuitry or, as in this case, gate control. Given these starting conditions, the commutation process from switching device $S_1$ to switching device $S_3$ is referred to as the passive commutation sequence.

Three modes are identified in the passive commutation sequence. These modes will be described with reference to FIG. 3. Mode 1 is defined for time $t<t_0$. This mode corresponds to the initial condition, where switching device $S_1$ conducts the full DC bus current $i_{dc}$, as illustrated in FIG. 3(a), wherein the current flow through the circuit 100 is designated by the thick black line. The snubber state variables during mode 1 are given by:

$v_{CS1}(t)=0$
$v_{CS3}(t)=-v_{i12}$
$v_{CS5}(t)=v_{i31}$
$i_{LS}(t)=0$

Mode 2 is defined for time to $t_0 \leq t < t_1$. At time $t=t_0$, the switching device $S_1$ is turned off. A turn on gate command is simultaneously applied to switching device $S_3$. However, switching device $S_3$ does not enter into conduction, since the voltage across the switching device $V_{CS3}(t_0)<0$. Hence, the dc bus current $i_{dc}$ commutates to the snubber capacitors 36–38, as illustrated in FIG. 3(*b*). The snubber state variables during this mode are described by the following equations:

$$V_{CSn}(t) = \frac{i_{dc}}{3C_S}(t - t_0) + V_{CSn}(t_0) \quad (1)$$

$$i_{LS}(t)=0 \quad (2)$$

where $C_S=C_{S1}=C_{S3}=C_{S5}$ and n=1, 3, 5.

Mode 3 is defined for time $t_1 \leq t$. At time $t=t_1$, the voltage across switching device $S_3$ crosses zero with a positive derivative, and switching device $S_3$ enters into conduction under zero voltage conditions. The DC bus current $i_{dc}$ commutates from the snubber capacitors 36–38 to the switching device $S_3$, as illustrated in FIG. 3(*c*), completing the passive commutation process. The snubber variables at this new converter state are given by:

$v_{CS1}(t)=v_{i12}$
$v_{CS3}(t)=0$
$v_{CS5}(t)=-v_{i23}$
$i_{LS}(t)=0$.

Note that under passive commutation conditions, the incoming switching device, in this case switching device $S_3$, enters conduction under zero voltage, and, therefore, essentially lossless conditions. The passive commutation process always implies a forward voltage buildup across the outgoing switching device. Also, the fact that the AC voltages in the circuit are approximately constant during the commutation interval implies that the voltage across all three snubber capacitors 36–38 vary by the same amount. Hence, an essentially equal distribution of the DC bus current $i_{dc}$ among the snubber capacitors 36–38 is observed during Mode 2 of the passive commutation sequence (provided that there is minimum deviation in the capacitor values). The effective turn-off snubber capacitance value is then given by $3C_S$, as seen from Equation 1.

The active commutation sequence for the generalized current stiff converter circuit 100 will now be described. The active commutation sequence is illustrated in FIG. 4.

Consider again the situation where current commutation is taking place from switching device $S_1$ to switching device $S_3$. In this case, however, the angle of the AC input voltage vector is such that $v_{i1}<v_{i2}$. This situation corresponds to the classical load/line commutation, where zero current turn-off of the outgoing switching device is achieved by turning on the incoming switching device. Under these conditions, use of an active commutation unit in accordance with the present invention implies a significantly different commutation process. In accordance with the present invention, an active commutation unit, in combination with snubber capacitors connected across the switching devices, is used to implement a resonant snubber which provides an active lossless mechanism to achieve zero voltage switching of the incoming switching device. In this context, this commutation process is referred to as an active commutation sequence, in contrast with the passive commutation sequence just described.

Five modes of operation are identified in the active commutation sequence:

Mode 1 is defined for time $t<t_0$. This mode corresponds to the initial state, where switching device $S_1$ conducts the full DC bus current $i_{dc}$, as illustrated in FIG. 4(*a*). The snubber state variables in Mode 1 are given by:

$v_{CS1}(t)=0$
$v_{CS3}(t)=-v_{i12}$
$v_{CS5}(t)=v_{i31}$
$i_{LS}(t)=0$.

Mode 2 of the active commutation sequence is defined by times $t_0 \leq t < t_1$. If, at time $t_0$, outgoing switching device $S_1$ were turned off, and incoming switching device $S_3$ were turned on, switching device $S_3$ would enter conduction with a significantly high voltage level across the switching device, since $v_{i1}<v_{i2}$. To avoid this condition, and the attendant switching losses, at time $t=t_0$ the snubber switching device 82 ($T_S$) in the active commutation unit is turned on. The current $i_{LS}$ through the snubber inductor 80 in the active commutation unit rams up, driven by the voltage $v_{LS}(t_0)=v_{Sb}-v_{i1}$, $v_{LS}(t_0)>0$, as illustrated in FIG. 4(*b*). During Mode 2, the snubber state variables are given by the following equations:

$$V_{CSn}(t-t_0)=V_{CSn}(t_0) \quad (3)$$

$$i_{Ls}(t-t_0) = \frac{V_{Ls}(t_0)}{L_S}(t-t_0) + i_{Ls}(t_0) \quad (4)$$
$$= \frac{V_{Sb} - V_{i1}}{L_S}(t-t_0)$$

where $i_{LS(t0)}=0$ and n=1, 3, 5.

Mode 3 of the active commutation sequence is defined for times $t_1 \leq t < t_2$. At time $t=t_1$ the conducting switching device $S_1$ is turned off under either zero current or zero voltage conditions with either $i_{LS}(t_1) \geq i_{dc}$ or $i_{LS}(t_1)<i_{dc}$, respectively. The condition where $i_{LS}(t_1) \geq i_{dc}$ is due to the reverse recovery process in the conducting device associated with a zero current turn-off. With all the main switching devices off, a resonant mode takes place. During this mode, the flow of current shifts from the main switching devices to the snubber capacitors 36–38, and the voltage across the incoming switching device $S_3$ is driven down towards zero, as illustrated in FIG. 4(*c*). The snubber state variables during Mode 3 are given by the following equations:

$$V_{CSn}(t) = \quad (5)$$
$$Z_0[i_{dc} - i_{Ls}(t_1)]\sin\omega_0(t-t_1) + V_{Ls}(t_1)\cos\omega_0(t-t_1) - V_{Ls}(t_1) + V_{CSn}(t_1)$$

$$i_{Ls}(t) = \frac{1}{Z_0}V_{Ls}(t_1)\sin\omega_0(t-t_1) - [i_{dc} - i_{Ls}(t_1)]\cos\omega_0(t-t_1) + i_{dc} \quad (6)$$

where $V_{Sb} = V_{Ls}(t_1) + V_{i1}$, $\omega_0 = 1/\sqrt{L_S C_{Seq}}$ and $Z_0 = \sqrt{L_S / C_{Seq}}$, $C_{Seq} = 3C_s$.

Mode 4 of the active commutation sequence is defined for times $t_2 \leq t < t_3$. At the instant $t=t_2$, the voltage across the incoming switching device ($S_3$ in this case) is minimum and turn-on takes place under nearly or true zero voltage conditions. Current flow shifts from the snubber capacitors 36–38 to the incoming switching device $S_3$, and the converter reaches its final state, as illustrated in FIG. 4 (*d*). The current $i_{LS}$ in the snubber inductor 80 in the active commutation unit is driven down by the voltage $v_{LS}(t_2)=v_{Sb}-V_{i2}$, $v_{LS}(t_2)<0$. Mode 4 of the active commutation sequence is analogous to Mode 2 of the active commutation sequence. The snubber state variables for Mode 4 are given by the following equations:

$$V_{CSn}(t) = V_{CSn}(t_2) \tag{7}$$

$$i_{Ls}(t) = \frac{V_{Ls}(t_2)}{L_S}(t - t_2) + i_{Ls}(t_2) \tag{8}$$

$$= \frac{V_{Sn}(t_2) - V_b}{L_s}(t - t_2) + i_{dc}$$

where $i_{Ls}(t_2) \approx i_{dc}$.

Mode 5 of the active commutation sequence is defined for time $t \geq t_3$. At time $t=t_3$, $i_{LS}$ reaches the peak reverse recovery current of the snubber switching device $T_S$ in the active commutation unit, and this switching device snaps off, as illustrated in FIG. 4(e). The active commutation sequence is completed at this point. At this point the snubber state variables are given by:

$v_{CS1}(t)=v_{i12}$
$v_{CS3}(t)=0$
$v_{CS5}(t)=-v_{i23}$
$i_{LS}(t)=0$.

Note that in the active commutation sequence, the incoming switching device, in this case switching device $S_3$, is turned on at or near zero voltage switching conditions in a near lossless manner. Note also that the active commutation sequence requires that the voltage across the snubber inductor 80 $v_{LS}(t_0)=v_{LS}(t_1)>0$ and $v_{LS}(t_2)<0$ achieve the required conditions for turn-on and turn-off of the snubber switching device $T_S$ in the active commutation unit. This fact imposes an important restriction on the snubber driving voltage $v_{Sb}$ with respect to the phase voltages associated with the incoming and outgoing switching devices. For instance, $v_{Sb}$ has to be such that $v_{i1}<v_{Sb}<v_{i2}$ in this case. Also, the equivalent snubber capacitance corresponds to $3C_S$ during the resonant mode (Mode 3). This situation is similar to the one observed in the passive commutation sequence, and implies that the resonant current is equally shared by all the snubber capacitors in the switching device group. Again, since the incoming AC voltages are virtually constant during the commutation processes, all the switching devices are subject to the same voltage variation. Another important point is that the active commutation sequence implies that the outgoing switching device is reverse biased after the commutation sequence is finished.

Equation 1 above defines the conditions necessary to complete the passive commutation sequence. From the definition of the snubber state variables in FIG. 2, and the conditions under which the passive commutation takes place, the necessary and sufficient condition associated with the passive commutation sequence can be simply stated as $i_{dc}>0$. This condition is always fulfilled in medium voltage induction motor drive applications, where the DC bus current $i_{dc}$ is unidirectional and significantly larger than zero. The only situation where this condition is not satisfied is at the start-up of the power conversion circuit. Thus, special starting procedures may be required to build up minimum current levels through the DC bus inductance during start-up.

In the passive commutation sequence context, optimal commutation conditions are defined in terms of the dV/dt applied across the main converter switching devices leading to a suitable reduction of the switching losses. Note that there is no control over the passive commutation process other than the proper design of the snubber capacitors (e.g., 36–38) for the range of variation of the DC bus current $i_{dc}$. As a result, the optimal design is completely determined by the switching characteristics of the power switching devices (e.g., 30–32) employed in the power conversion system.

Equation 3 above describes the voltage across any of the snubber capacitors 36–38 during the resonant mode of the active commutation sequence. The following equation can be obtained from Equations 3 and 4 for any t in the interval $t_1 \leq t < t_2$:

$$[V_{CSn}(t)+V_{Ls}(t_1)-V_{CSn}(t)]^2+Z_0^2[i_{Ls}(t)-i_{dc}]_2=[V_{Ls}(t_1)]^2+Z_0^2[i_{dc}-i_{Ls}(t_1)]^2 \tag{9}$$

where n=1, 3, 5.

Figure 5:
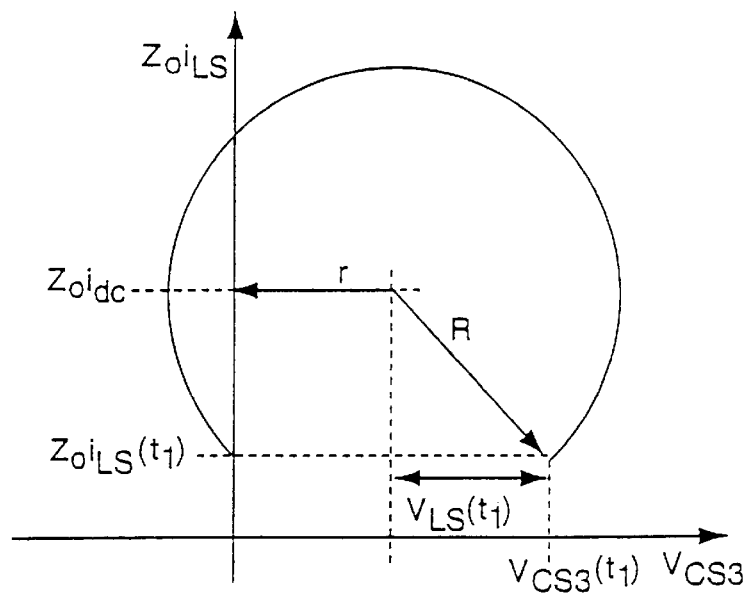
FIG. 5 illustrates a typical trajectory of the describing point associated with a resonant mode in an active commutation sequence of the simplified current stiff converter circuit of FIG. 2.

Equation 9 defines the trajectory of the snubber describing point in the phase plane for $t_1 \leq t < t_2$. This trajectory corresponds to a circle having a radius given by the square root of the right-hand side term of the equation. A typical trajectory of the describing point associated with the resonant mode in the active commutation sequence is shown in FIG. 5.

The desired operating condition implies that the voltage across the incoming switching device $S_3$ has its minimum at zero volts or lower. From FIG. 5 it is seen that this condition implies that $R \leq r$. Hence, an expression of the necessary condition to achieve a total voltage variation at least equal to $v_{CS3}(t_1)$ is given by $$[V_{Ls}(t_1)]^2+Z_0^2[i_{dc}-i_{Ls}(t_1)]^2 \geq [V_{Ls}(t_1)-V_{CS3}(t_1)]^2 \tag{10}$$

and $v_{Sb}=v_{LS}(t_1)+v_{i1}$.

Equation 10 above defines two input variables that may be manipulated to guarantee the zero-voltage turn-on the incoming switching device. These input variables are the snubber driving voltage $v_{Sb}$ and the current in the commutation unit inductor $i_{LS}(t_1)$. The necessary condition given by Equation 10 suggests a coordination between these two variables. As will be shown, this condition can be relaxed to achieve a simpler control implementation in some practical situations.

A sufficient condition for successful completion of the active commutation process can be obtained by verifying that for $\omega_o(t-t_1)=\pi$, Equation 3 can be written in the form shown in the following Equation 11. Hence, for $V_{CS3}(t_2) \leq 0$:

$$V_{CS3}(t_2)=-2V_{LS}(t_1)+V_{CS3}(t_1) \leq 0. \tag{11}$$

Solving Equation 11 for $v_{LS}(t_1)$, the sufficient condition can be expressed in the form of $$V_{LS}(t_1) \geq \frac{V_{CS3}(t_1)}{2}. \tag{12}$$

From Equation 12, and recognizing that $v_{LS}(t_1)=v_{Sb}-v_{i1}$, the sufficient condition to achieve zero voltage turn-on of the incoming switching device can be finally expressed in terms of a constraint on the snubber driving voltage $V_{Sb}$, as shown in Equation 13:

$$V_{Sb} \geq \frac{V_{i1} + V_{i2}}{2}. \tag{13}$$

The sufficient condition above states that the zero voltage turn-on of the incoming switching device can be guaranteed by proper setting of the snubber driving voltage $v_{Sb}$, regardless of the amplitude of the initial current through the snubber inductance $L_S$. Equation 13 can be generalized by recognizing that $v_{i1}$ and $v_{i2}$ are the AC phase voltages associated with the outgoing and incoming switching devices respectively.

Optimal commutation conditions in the active commutation sequence context are obtained by satisfying the necessary condition, stated in Equation 10, while simultaneously minimizing the current and voltage stress on the main power devices and on the snubber components as well. The optimal commutation conditions are derived by computing the situation leading to the minimum variation of the state variables (circle with the minimum radius). The boundary condition is given by $v_{CS3}(t_2)\sim 0$. The latter constraint implies that the other switches in the switching device group are not subject to any extra voltage stress associated with the commutation process. After introducing the constraint $V_{CS3}(t_2)\sim 0$ into Equation 9, the optimal commutation conditions can be obtained by inspection of the resultant equation. The final form of the optimal commutation conditions are expressed as follows:

$$V_{Sb} = V_{Ls}(t_1) + V_{iI} = \frac{V_{CS3}(t_1)}{2} \quad (14)$$

$$= \frac{V_{iI} + V_{i2}}{2}$$

$$i_{Ls}(t_1) = i_{dc} \quad (15)$$

where $v_{CS3}(t_1) = -v_{i1} + v_{i2}$.

Optimal commutation conditions cannot be exactly obtained due to delays and other limitations present in practical systems. Nevertheless, reasonable approximations can be achieved so that current and voltage stresses on the snubber components and on the main power switching devices can be significantly reduced. As has been pointed out, the optimal commutation conditions, expressed by Equations 14 and 15, can be generalized by recognizing that $v_{i1}$ and $v_{i2}$ are the AC phase voltages associated with the outgoing and incoming devices, respectively.

Having described in detail control of the switching devices in the rectifier 12, inverter 18, and snubber commutation units 14, 20, of a current stiff power conversion system in accordance with the present invention in a general context, we will now describe control of the commutation process in the exemplary power conversion system 10 in more detail and through further examples.

Figure 6:
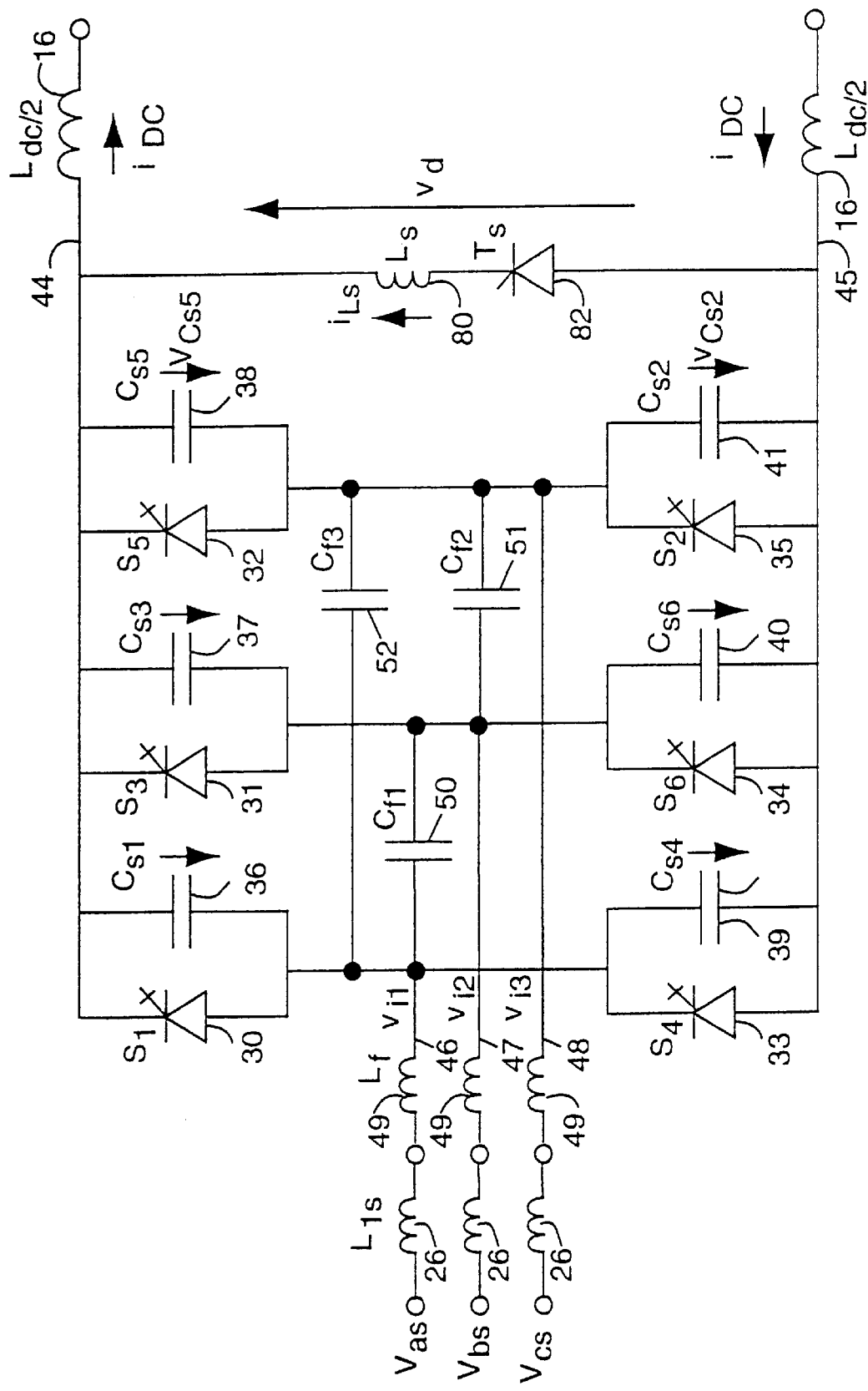
FIG. 6 is a schematic circuit diagram of an exemplary current stiff rectifier front end with resonant snubbers in accordance with the present invention.

Because both the rectifier 12 and the inverter 18 require similar control of the commutation process, it is sufficient to describe the operation of one of them. Thus, we will now describe control of the rectifier front end 12. An exemplary rectifier front end 12 for a particular realization of a current stiff converter with resonant snubbers in accordance with the present invention is illustrated in FIG. 6. In the circuit illustrated in FIG. 6, the voltage on the DC bus between lines 44 and 45 is designated as $v_d$. The voltages across the switching devices $S_1$ through $S_6$ are designated as $v_{CS1}$ through $v_{CS6}$ respectively, and the current through the switching devices are designated as $i_{S1}$ through $i_{S6}$, respectively.

Figure 7:
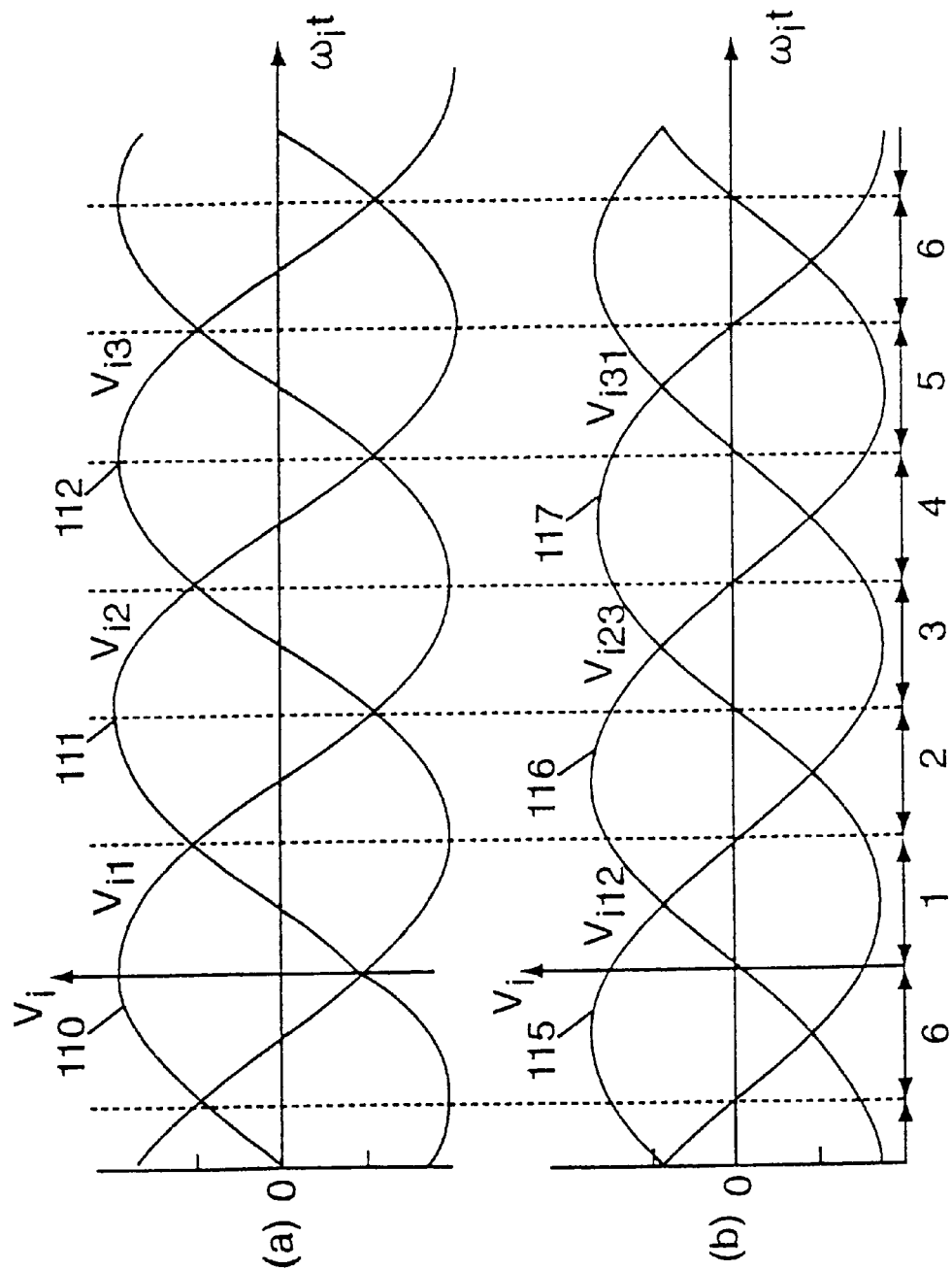
FIG. 7 is an illustration of exemplary voltage versus time waveforms for the AC input signals to the exemplary current stiff rectifier front end of FIG. 6.

Exemplary three phase input voltages $v_{i1}$, $v_{i2}$ and $v_{i3}$ on input lines 46, 47, and 48 are illustrated at 110, 111, and 112, respectively, as a function of time, in FIG. 7(a). The input voltages can be described by the following equations:

$$v_{i1} = V_i \cos(\omega_i t + \theta_i)$$

$$v_{i2} = V_i \cos(\omega_i t + \theta_i - 120°)$$

$$v_{i3} = V_i \cos(\omega_i t + \theta_i + 120°)$$

where $$\omega_i = 2\pi f_i = \frac{2\pi}{T_i}.$$

FIG. 7(b) illustrates at 115, 116, and 117, respectively, the line-to-line voltage between input lines 46 and 47, designated as $v_{i12}$, the line-to-line voltage between input lines 47 and 48, designated as $v_{i23}$, and the line-to-line voltage between input lines 48 and 46, designated as $v_{i31}$, all as a function of time. From FIG. 3(b), it can be observed that a three phase system allows six 60 degree voltage intervals to be defined (per period of the input voltages) in which none of the three line-to-line voltages change polarity. For example, in voltage interval 1, both $v_{i12}$ and $v_{i23}$ are positive, and $v_{i31}$ is negative, for the entire voltage interval.

For the case where $\theta_i = 0$, the voltage intervals are defined by the following equations:

voltage interval 1: $0° \leq \omega_i t \leq 60°$ voltage interval 2: $60° \leq \omega_i t \leq 120°$ voltage interval 3: $120° \leq \omega_i t \leq 180°$ voltage interval 4: $180° \leq \omega_i t \leq 240°$ voltage interval 5: $240° \leq \omega_i t \leq 300°$ voltage interval 6: $300° \leq \omega_i t \leq 360°$ In accordance with the present invention a control strategy may be used to achieve optimal commutation conditions within the current stiff rectifier with resonant snubbers. As described previously, with reference to FIG. 2, the passive commutation sequence in a current stiff converter occurs without need for controlling the switching device 82 in the active commutation unit.

Thus, zero voltage switching of an incoming switching device in a current stiff converter in accordance with the present invention is achieved without control of the active commutation unit switching device 82 when the conditions for the passive commutation sequence are present.

When the conditions for the passive commutation sequence are not present, the active commutation sequence is employed by controlling the switching device 82 in the active commutations unit to achieve zero voltage switching conditions for an incoming switching device. For the exemplary current stiff rectifier circuit realization of FIG. 6, the active commutation sequence requires control of the switching devices 33–35 in the common-anode group of switching devices to obtain the required snubber driving voltage $v_{Sb}$ that leads to optimal commutation conditions for the switching devices 30–32 in the common-cathode group of switching devices. This is accomplished by the use of an intermediate converter state (with devices in both switching device groups conducting) for an interval necessary for the required energy levels to build up in the snubber components.

FIG. 8 illustrates, in exemplary form, an active commutation sequence in accordance with the present invention, where the current commutates from the pair of switching devices 32 and 35 $\{S_5, S_2\}$, referred to as current vector $i_o$, to switching devices 30 and 35 $\{S_1, S_2\}$, referred to as current vector $i_1$ in the exemplary rectifier front end circuit.

It is assumed that $V_{i1} > V_{i2} > V_{i3}$, implying that switching device $S_1$ is forward biased at the beginning of the commutation interval. Thus, an active commutation interval is required for zero voltage turn on of switching device $S_1$.

From FIG. 6 it is seen that the snubber active commutation unit components form the structure of a zero current switch. Necessary conditions for the operation of the switching device Ts in the active commutation unit in the zero current switching mode (ZCS) are:

i) $v_d < 0$ at turn-on (forward bias); and ii) $v_d > 0$ at the end of the commutation interval.

The above snubber driving voltage conditions can be established actively through proper control of the main converter switching devices 30–35. The dc side voltage in a current stiff converter, at any instant, is given by the scalar product:

$$v_d = \frac{i_n}{|i_n|} \cdot v_i \qquad (16)$$

where $i_n$ is one of the converter current vectors and $v_i$ is the instantaneous terminal voltage vector. The required inversion of $v_d$ is accomplished if, for instance, active current vectors 180° apart are chosen in sequence. For the initial conditions of the circuit. (FIG. 8a), the requirements for the ZCS turn-off of $T_s$ imply that $i_1 \cdot v_i > 0$. Define a current vector $i_4$ which is the current vector in the rectifier circuit when switching devices $S_4$ and $S_5$ are on and conducting. Since $i_1 = -i_4$, then $i_4 \cdot v_{1i} < 0$ and the turn-on condition is met if the vector $i_4$ is introduced in the active commutation mode sequence. The snubber driving voltage $V_{Sb}$ obtained this way corresponds to the one leading to optimal commutation conditions as described before.

The active commutation modes illustrated in FIG. 8 are described as follows:

Mode 1 ($t < t_0$): This is the initial condition with the switching device pair $\{S_5, S_2\}$ conducting. In this mode the DC bus current $v_d = 0$.

Mode 1a ($t_0 \leq t < t_1$): At times $t = t_0$ a passive commutation from switching device $S_1$ to switching device $S_4$ is initiated by turning off switching device $S_1$. Switching device $S_4$ is simultaneously turned on but does not enter conduction. Current commutates from the switching device $S_2$ to the snubber capacitors 39–41 associated with the switching devices 33–35 in the common-anode group of switching devices.

Mode 1b ($t_1 \leq t < t_0'$): At time $t = t_1$, the switching device $S_4$ enters conduction under zero voltage conditions. The pair $\{S_5, S_4\}$ conducts the current, clamping the voltages across the other switching devices to the AC line voltage levels. This mode leads to a condition where the DC bus voltage $v_d < 0$ and switching device Ts in the active commutation unit is forward biased.

Mode 2 ($t_2 \leq t < t_3$): At time $t = t_2$, the snubber switching device $T_s$ is turned on. The current through the snubber inductance 82 $i_{Ls}$ ramps up driven by the DC bus voltage $v_d$. The line currents ramp down.

Mode 3 ($t_3 \leq t < t_4$): At time $t = t_3$, the snubber inductor current $i_{Ls}$ reaches an amplitude equal to the DC bus current $i_{DC}'$ The switching devices $S_4$ and $S_5$ turn-off under zero current conditions. Since none of the main switching devices are on, a null current vector is applied at the AC input terminals. With all the main switching devices off, a resonant mode takes place. During this mode, the voltages across the incoming switching devices are driven down towards zero. Essentially zero extra voltage stress is obtained during this mode since all snubber capacitors 36–41 are involved, constraining the voltage swing across each switching device to a maximum magnitude equal to the line-to-line peak voltage.

Mode 4 ($t_4 \leq t < t_5$): At time $t = t_4$, the voltage across the incoming switching devices $\{S_1, S_2\}$ is minimum, and turn on of the switching devices takes place under nearly or at zero voltage conditions. At this point the DC bus voltage $v_d > 0$ and the snubber inductor current $i_{Ls}$ ramps down.

Mode 5 ($t \geq t_5$): At time $t = t_5$, the snubber inductor current $i_{Ls}$ reaches zero and the switching device $T_s$ in the active commutation unit turns off under zero current conditions. The current vector $i_1$ is injected in the AC terminals, and the commutation process is finished.

An important observation with regard to the active commutation sequence just described is the fact that no detrimental effects arise from the zero current commutation of the conducting devices. In fact, the reverse recovery of the main switching devices allows the current through the snubber inductor to reach an amplitude higher than the DC bus current level. The extra energy stored in the conductor 80 contributes for the compensation of the losses in the snubber inductor/switching device branch which makes up the active commutation unit. Hence, attention should be paid to the reverse recovery characteristics of the main converter switching devices 30–35 when designing the resonant snubber components 36–41 and 80.

One object of the present invention is to provide an implementation of current stiff converters with both high switching frequency and PWM capability. Reduced switching losses and minimization or elimination of extra current and voltage stresses on the main switching devices are the key elements to meet the desired performance and cost constraints. The reduced switching losses achieved by the commutation sequences just described, mainly the active commutation sequence, provides a significant contribution in this direction. Further reduction of switching losses are obtained if the total number of switchings per unit of time is minimized.

Figure 9:
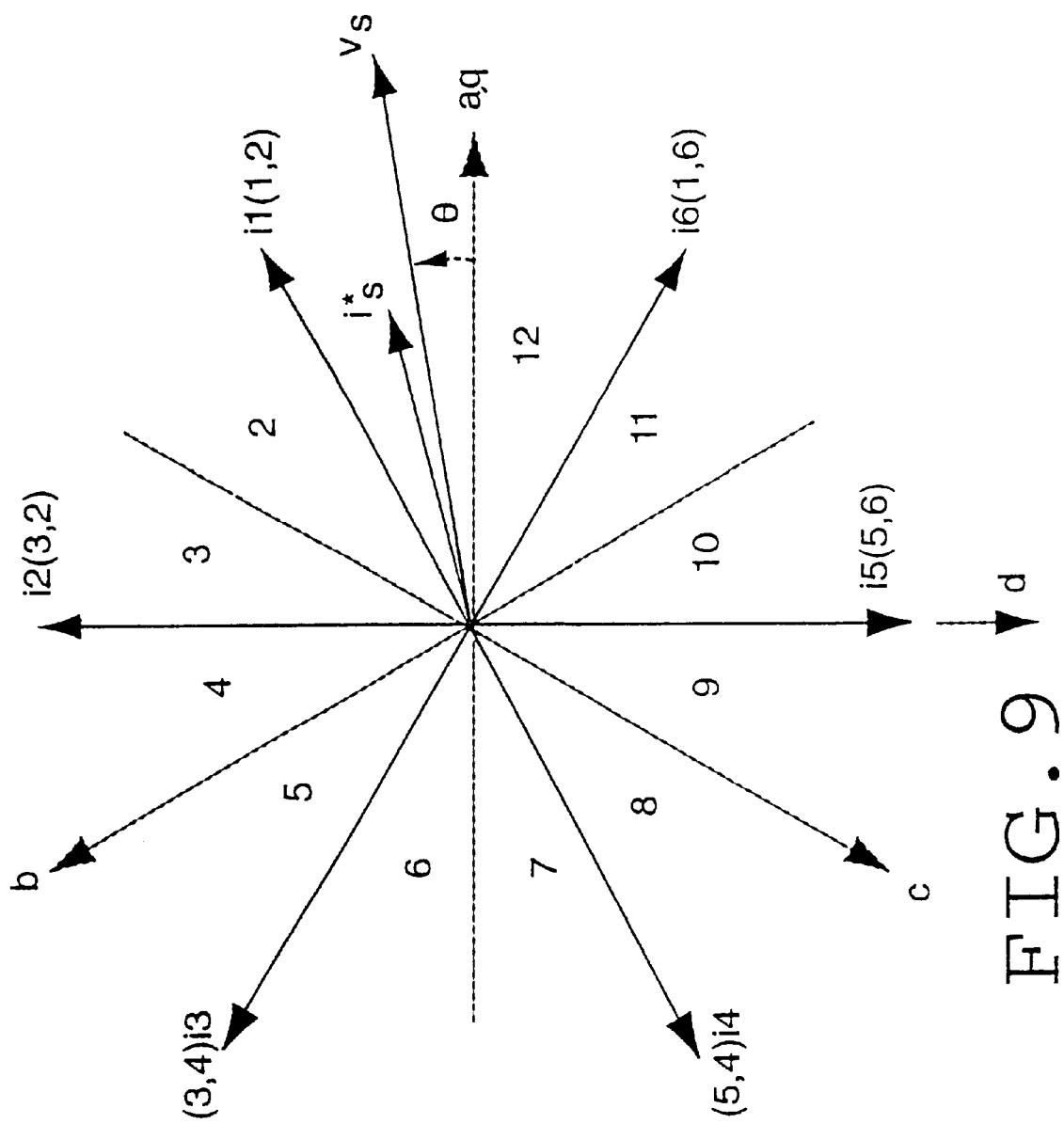
FIG. 9 is a space vector representation of operation of a rectifier front end current stiff converter in accordance with the present invention.

FIG. 9 illustrates a typical situation associated with the operation of the rectifier front end of a power conversion circuit in accordance with the present invention. FIG. 9 employs space vector representations. Vector $i_s^*$ represents a reference current vector, and vector $v_s$ is a vector associated with the voltages at the rectifier AC input terminals. The instantaneous a, b and c phase components of the vectors $i_s^*$ and $v_s$ are given by their projection on the a, b and c axes. Unity power factor is illustrated, since this is the desired operating condition for a high performance rectifier.

The current vector $i_s^*$ can be synthesized at the rectifier input, in an average sense, by proper selection, sequencing and timing of some or all of the nine converter current vectors (vectors $i_7 = i_8 = i_9 = i_0$ correspond to the null vector). For the condition in FIG. 9, the target current vector can be synthesized from a linear combination of the vectors adjacent to $i_s^*$, in the form:

$$T_s i_s = \Delta t_1 i_1 + \Delta t_2 i_2 + \Delta t_0 i_0 \qquad (17)$$

with $T_s = \Delta t_1 + \Delta t_2 + \Delta t_0$.

The switching timing can be computed directly from the description of the reference and the converter adjacent vectors in the complex plane. General equations for the space vectors PWM in current stiff converters are given by:

$$\Delta t_m = \frac{T}{i_{dc}}(-i_{qs}^* \sin\theta_n - i_{ds}^* \cos\theta_n) \qquad (18)$$

$$\Delta t_n = \frac{T}{i_{dc}}(-i_{qs}^* \sin\theta_n - i_{ds}^* \cos\theta_m)$$

where T is the switching period; and $i_{qs}^*$ and $i_{ds}^*$ are the components of the command current vector $i_s^*$ in the orthoganal stationary reference frame shown in FIG. 9. The subscripts m and n in Equation (18) identify the converter current vectors $i_m$ and $i_n$ involved in the modulation process (active vectors adjacent to $i_s^*$ such that $i_m$ always leads $i_n$ by $\pi/3$ rad (m,n=1,2,3 . . . ,6)). $\theta_m$ and $\theta_n$ are the angles of the vectors $i_m$ and $i_n$ with respect to the quadrature axis (positive real axis) and $\theta_m - \theta_n = \pi/3$.

Several switching schemes may be used for the implementation of the space vector PWM. In a current stiff converter, the switching sequence that minimizes the total number of switchings (including the switching of the snubber switching device Ts) is unique for each mode of operation. For the condition in FIG. 9 the proper switching sequence is: $i_1 \{S_1,S_2\} \to i_6 \{S_1,S_6\} \to i_0 \{S_1,S_4\} \to i_1 \{S_1,S_2\}$ . . . This particular switching sequence is selected based on the fact that it leads to two passive commutations (where the snubber switching device is not involved) and only one active commutation per switching period.

The association between the position of vectors $i_s^*$ and $v_s$ in the complex plane, and the corresponding converter switching sequence, can be generalized for the entire complex plane. In fact, a suitable switching sequence can be found for any position of vectors $i_s^*$ and $v_s$ in the complex plane. A switching map for the rectifier mode of operation where the position of the vectors $i_s^*$ and $v_s$ in particular sectors of the complex plane is mapped into a suitable switching sequence, is shown in Table I. (The letters a and p in Table 1 indicate active and passive commutation sequences, respectively.) The intermediate converter state employed as part of the active commutation process is also shown in the following tables (between brackets).

TABLE I

Rectifier Mode

| $i_s^*$ sector | $v_s$ sector | sequence |
|---|---|---|
| 1,12 | 1,2 | $i_0 \to (i_4) \xrightarrow{a} i_1 \xrightarrow{p} i_6 \xrightarrow{p} i_0$ |
| 2,3 | 1,2 | $i_0 \to (i_4) \xrightarrow{a} i_1 \xrightarrow{p} i_2 \xrightarrow{p} i_0$ |
| 2,3 | 3,4 | $i_0 \to (i_5) \xrightarrow{a} i_2 \xrightarrow{p} i_1 \xrightarrow{p} i_0$ |
| 4,5 | 3,4 | $i_0 \to (i_5) \xrightarrow{a} i_2 \xrightarrow{p} i_3 \xrightarrow{p} i_0$ |

TABLE I-continued

Rectifier Mode

| $i_s^*$ sector | $v_s$ sector | sequence |
|---|---|---|
| 4,5 | 5,6 | $i_0 \to (i_6) \xrightarrow{a} i_3 \xrightarrow{p} i_2 \xrightarrow{p} i_0$ |
| 6,7 | 5,6 | $i_0 \to (i_6) \xrightarrow{a} i_3 \xrightarrow{p} i_4 \xrightarrow{p} i_0$ |
| 6,7 | 7,8 | $i_0 \to (i_1) \xrightarrow{a} i_4 \xrightarrow{p} i_3 \xrightarrow{p} i_0$ |
| 8,9 | 8,10 | $i_0 \to (i_2) \xrightarrow{a} i_5 \xrightarrow{p} i_4 \xrightarrow{p} i_0$ |
| 10,11 | 9,10 | $i_0 \to (i_2) \xrightarrow{a} i_5 \xrightarrow{p} i_6 \xrightarrow{p} i_0$ |
| 10,11 | 11,12 | $i_0 \to (i_3) \xrightarrow{a} i_6 \xrightarrow{p} i_5 \xrightarrow{p} i_0$ |
| 1,12 | 11,12 | $i_0 \to (i_3) \xrightarrow{a} i_6 \xrightarrow{p} i_5 \xrightarrow{p} i_0$ |

Four quadrant operation is achieved by augmenting the switching map for rectifier operation, including the inverter and reactor modes, presented in Tables II and III, respectively.

TABLE II

Inverter Mode

| $i_s^*$ sector | $v_s$ sector | sequence |
|---|---|---|
| 6,7 | 1,2 | $i_4 \to (i_1) \xrightarrow{a} i_0 \xrightarrow{p} i_3 \xrightarrow{p} i_4$ |
| 8,9 | 1,2 | $i_4 \to (i_1) \xrightarrow{a} i_0 \xrightarrow{p} i_5 \xrightarrow{p} i_4$ |
| 8,9 | 3,4 | $i_5 \to (i_2) \xrightarrow{a} i_0 \xrightarrow{p} i_4 \xrightarrow{p} i_5$ |
| 10,11 | 3,4 | $i_5 \to (i_2) \xrightarrow{a} i_0 \xrightarrow{p} i_6 \xrightarrow{p} i_5$ |
| 10,11 | 5,6 | $i_6 \to (i_3) \xrightarrow{a} i_0 \xrightarrow{p} i_5 \xrightarrow{p} i_6$ |
| 1,12 | 5,6 | $i_6 \to (i_3) \xrightarrow{a} i_0 \xrightarrow{p} i_1 \xrightarrow{p} i_6$ |

TABLE II-continued

Inverter Mode

| $i^*_s$ sector | $v_s$ sector | |
|---|---|---|
| 1,12 | 7,8 | $i_1 \longrightarrow (i_4) \xrightarrow{a} i_0 \xrightarrow{p} i_6 \xrightarrow{p} i_1$ |
| 2,3 | 7,8 | $i_1 \longrightarrow (i_4) \xrightarrow{a} i_0 \xrightarrow{p} i_2 \xrightarrow{p} i_1$ |
| 2,3 | 9,10 | $i_2 \longrightarrow (i_5) \xrightarrow{a} i_0 \xrightarrow{p} i_1 \xrightarrow{p} i_2$ |
| 4,5 | 9,10 | $i_2 \longrightarrow (i_5) \xrightarrow{a} i_0 \xrightarrow{p} i_3 \xrightarrow{p} i_2$ |
| 4,5 | 11,12 | $i_3 \longrightarrow (i_6) \xrightarrow{a} i_0 \xrightarrow{p} i_2 \xrightarrow{p} i_3$ |
| 6,7 | 11,12 | $i_3 \longrightarrow (i_6) \xrightarrow{a} i_0 \xrightarrow{p} i_4 \xrightarrow{p} i_3$ |

TABLE III

Reactor Mode

| $i^*_s$ sector | $v_s$ sector | |
|---|---|---|
| 4,5 | 1,2 | $i_3 \longrightarrow (i_4) \xrightarrow{a} i_2 \xrightarrow{p} i_0 \xrightarrow{p} i_3$ |
| 10,11 | 1,2 | $i_5 \longrightarrow (i_4) \xrightarrow{a} i_6 \xrightarrow{p} i_0 \xrightarrow{p} i_5$ |
| 6,7 | 3,4 | $i_4 \longrightarrow (i_5) \xrightarrow{a} i_3 \xrightarrow{p} i_0 \xrightarrow{p} i_4$ |
| 1,12 | 3,4 | $i_6 \longrightarrow (i_5) \xrightarrow{a} i_1 \xrightarrow{p} i_0 \xrightarrow{p} i_6$ |
| 8,9 | 5,6 | $i_5 \longrightarrow (i_6) \xrightarrow{a} i_4 \xrightarrow{p} i_0 \xrightarrow{p} i_5$ |
| 2,3 | 5,6 | $i_1 \longrightarrow (i_6) \xrightarrow{a} i_2 \xrightarrow{p} i_0 \xrightarrow{p} i_1$ |
| 10,11 | 7,8 | $i_6 \longrightarrow (i_1) \xrightarrow{a} i_5 \xrightarrow{p} i_0 \xrightarrow{p} i_6$ |
| 4,5 | 7,8 | $i_2 \longrightarrow (i_1) \xrightarrow{a} i_3 \xrightarrow{p} i_0 \xrightarrow{p} i_2$ |

TABLE III-continued

Reactor Mode

| $i^*_s$ sector | $v_s$ sector | |
|---|---|---|
| 1,12 | 9,10 | $i_1 \longrightarrow (i_2) \xrightarrow{a} i_6 \xrightarrow{p} i_0 \xrightarrow{p} i_1$ |
| 6,7 | 9,10 | $i_3 \longrightarrow (i_2) \xrightarrow{a} i_4 \xrightarrow{p} i_0 \xrightarrow{p} i_3$ |
| 2,3 | 11,12 | $i_2 \longrightarrow (i_3) \xrightarrow{a} i_1 \xrightarrow{p} i_0 \xrightarrow{p} i_2$ |
| 8,9 | 11,12 | $i_4 \longrightarrow (i_3) \xrightarrow{a} i_5 \xrightarrow{p} i_0 \xrightarrow{p} i_4$ |

Notice that expanding the converter power transfer capability to full four quadrant operation implies that any further reference to the rectifier 12 or inverter 18 front-ends of the full AC-to-AC power conversion topology 10 is less significant than the specification of the operating mode of the power converter topology in FIG. 6.

It is important to point out that the switching maps in Tables I and II (rectifier and inverter modes, respectively) can be used for displacement power factor angles up to $|\Phi|\pm30°$. Lower displacement power factor operating conditions require the addition of Table III (reactor mode). These switching maps can be used individually (one quadrant operation), in pairs (two/three quadrant operation) or all together (four quadrant operation). Smooth transition between two is, switching maps is assured by the switching sequence shown in Tables I–III, with all switching sequences starting with the active commutation sequence. Notice that any switching sequence starts at Mode 1 of the active commutation process (passive commutation to the intermediate converter state). This transition is always possible since the intermediate state in the active commutation sequence is defined as the one that minimizes the inner product in Equation 16. The proper switching sequence proceeds from this point. These switching maps can also be used for other realizations of current stiff converters in accordance with the present invention. One basic modification which may be made is to drop the intermediate commutation states associated with the establishment of the proper snubber driving voltage (i.e., modes 1a and 1b illustrated in FIG. 8).

Figure 10:
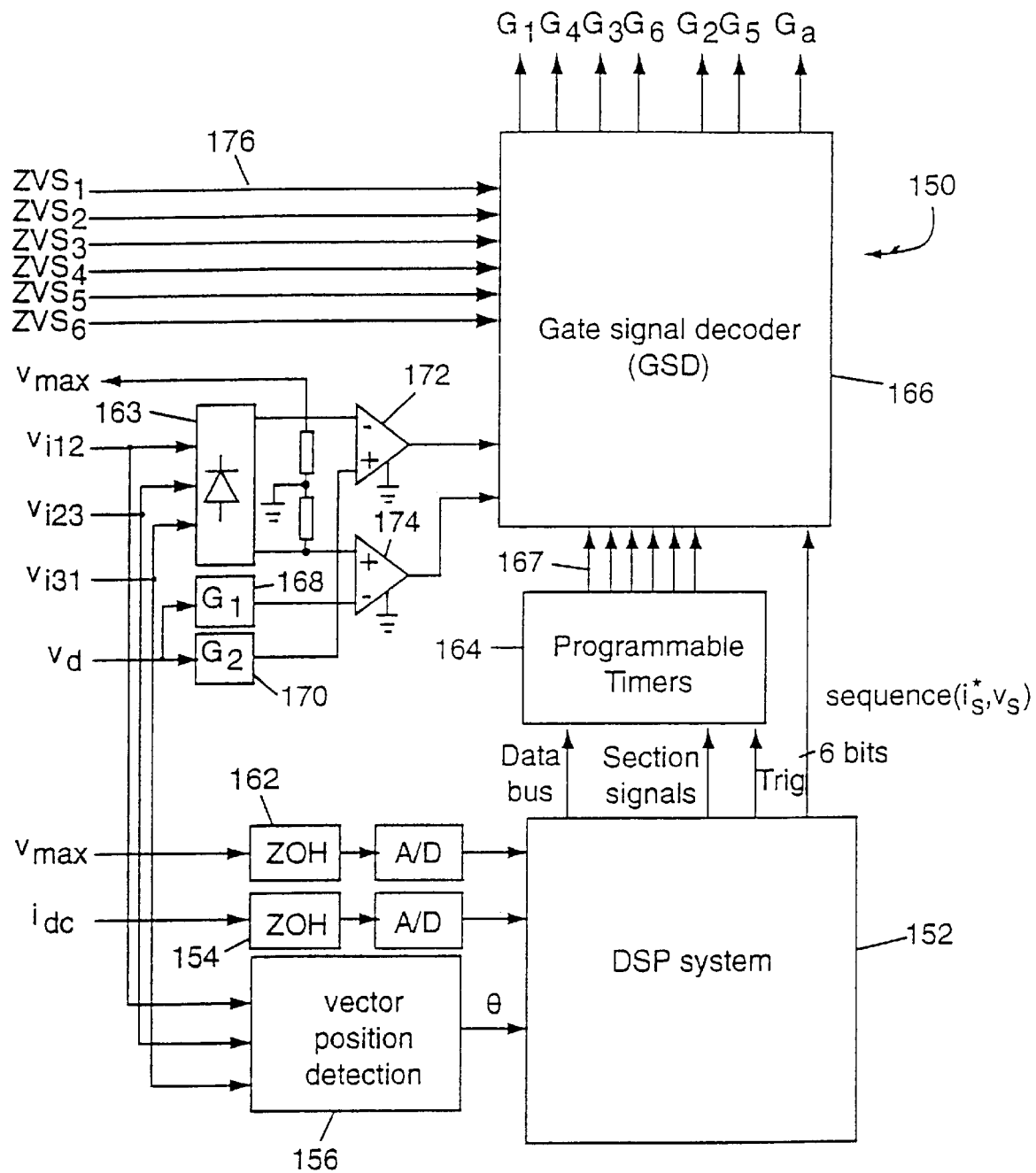
FIG. 10 is a circuit diagram of an exemplary firing and control circuit for the present invention.

FIG. 10 shows a block diagram representation of an exemplary minimum control hardware 150 for a current stiff converter in accordance with the present invention. This exemplary hardware is able to perform all the basic control and modulation functions required for the converter operation in rectifier, inverter or reactor modes. Other high level control functions can also be implemented with the addition of extra hardware and/or software.

A digital signal processor (DSP) system 152 provides all high level control functions: DC link current control, input displacement power factor control, and all the computations related to the space vector modulation described previously. The DC bus current may be measured directly using an A/D channel 154. The DC bus current signal is used for two different functions. The DC bus current $i_{DC}$ is used primarily as the feedback signal for the DC bus current control loop (required for proper operation of all conventional current stiff converter topologies). DC bus current magnitude data is also used in the computation of the switching intervals (space vector modulation) according to the equations presented above.

Figure 11:
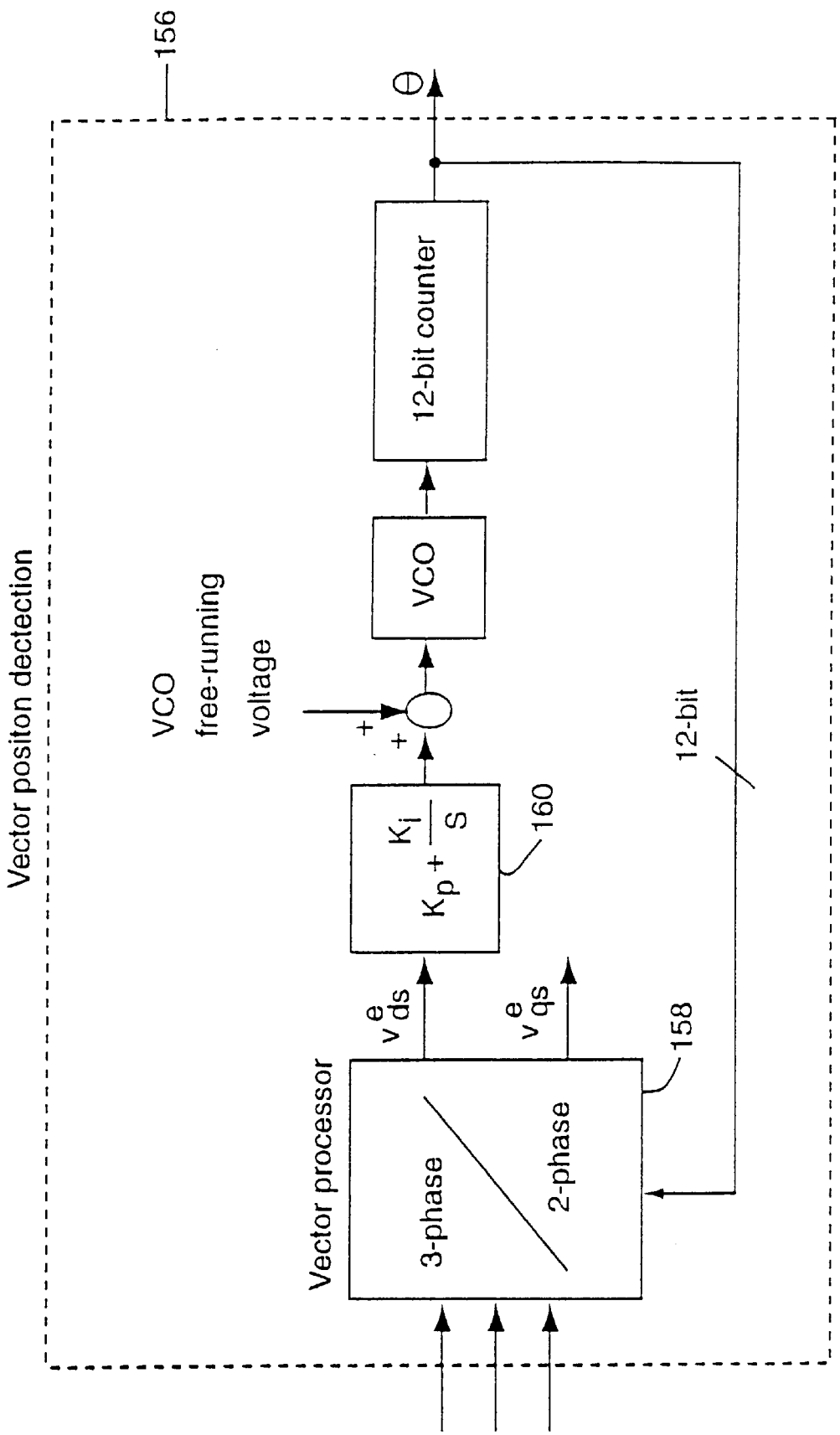
FIG. 11 is a schematic block diagram of an exemplary vector position detector for the firing and control circuit of FIG. 10.

A vector position detector 156 determines the position of the voltage vector Vs. An exemplary vector position detector is illustrated in and described in more detail with reference to FIG. 11. The determination of the position of the voltage vector $v_s$ is based on the transformation of the line-to-line input voltages $V_{i12}$, $V_{i23}$ and $V_{i31}$ from the three-phase reference frame to a two-phase synchronous frame in a phase-locked loop 158. In this scheme, a proportional-integral regulator 160 is employed to guarantee that the d-axis component of $v_s$ in the synchronous frame is set to zero. As a result, the q-axis of the synchronously rotating reference frame is aligned with $v_s$, and the angle of the transformation corresponds to the angle of the terminal voltage vector. This function can also be implemented in software, requiring the measurement of at least two line-to-line voltages. From the acquisition of θ (the instantaneous position of $v_s$ in the stationary frame shown in FIG. 9), the computation of the position of vector $i_s^*$ is promptly obtained, for a given displacement power factor angle. The amplitude of $i_s^*$ is obtained from the DC link control loop and other high level control functions. The stationary reference frame components required by the space vector modulation are then obtained from the computation of the projection of $i_s^*$ on the d and q axis of the stationary reference frame. The converter current vectors $i_m$ and $i_n$ used in the space vector modulation process are selected based on the computed position of the vector $i_s^*$ according to Table IV.

TABLE IV

Space vector modulation - adjacent vectors

| arg(i*$_s$) [rad] | i$_m$ | i$_n$ | θ$_m$[rad] | θ$_n$[rad] |
|---|---|---|---|---|
| −π/6 ≦ θ$_{is}$ < π/6 | i$_1$ | i$_6$ | π/6 | −π/6 |
| π/6 ≦ θ$_{is}$ < π/2 | i$_2$ | i$_1$ | π/2 | π/6 |
| π/2 ≦ θ$_{is}$ < 5π/6 | i$_3$ | i$_2$ | 5π/6 | π/2 |
| 5π/6 ≦ θ$_{is}$ < −5π/6 | i$_4$ | i$_3$ | −5π/6 | 5π/6 |
| −5π/6 ≦ θ$_{is}$ < −π/2 | i$_5$ | i$_4$ | −π/2 | −5π/6 |
| −π/2 ≦ θ$_{is}$ < −π/6 | i$_6$ | i$_5$ | −π/6 | −π/2 |

Application of Equations 18 leads to the computation of the switching intervals to synthesize the command current vector $i_s^*$ at the converter AC terminals under ideal switching conditions. The effect of the commutation processes on the AC current waveform can be minimized if the lengths of the commutation intervals are estimated. Special attention is given to the interval corresponding to Mode 3 in the active commutation sequence. This interval can be estimated with reasonable accuracy from the measurements of $i_{DC}$ and $v_d$ and the snubber inductor parameters. The effect of Mode 3 on the AC current waveforms is compensated by adding the estimated length of this interval to the length of the interval corresponding to the first vector in the next switching sequence (from Table I to III).

The DSP 152 programs the switching intervals in programmable timers 164 and triggers those timers 164. It also outputs the position of $v_s$ and $i_s^*$ to a gate signal decoder 166. This information is coded in 6-bit code, with each 3-bit subset identifying the sector in the complex plane where the voltage and current vectors lie.

In addition to the modulation intervals, timing of the active commutation sequence can also be computed using the DSP 152, as well as the on time of the snubber switching device. Estimates for the length of Modes 2, 4 and 5 can be obtained from measurement of $i_{dc}$ and $v_{max}$ provided to the DSP 152 ($v_{max}$ is the maximum line-to-line voltage at the commutation instant). As shown in FIG. 10, $v_{max}$ can be measured using one A/D channel 162 and a three-phase diode rectifier 163. Estimates of the length of the active commutation Modes 2, 4 and 5 are given by:

$$\Delta t_2 = 3C_3 \frac{v_{max} - \hat{v}_d}{i_{dc}} + \Delta t_{off} \qquad (19)$$

$$\Delta t_4 = L_s \frac{i_{dc}}{v_{max}}$$

$$\Delta t_5 = \pi \sqrt{\frac{3L_s C_s}{2}}$$

where $\hat{v}_d$ is an estimate of the dc bus voltage $v_d$ at the beginning of an active commutation interval, computed from the state of the main switches and position and amplitude of the voltage vector $v_s^*$ at the converter AC terminal.

Figure 12:
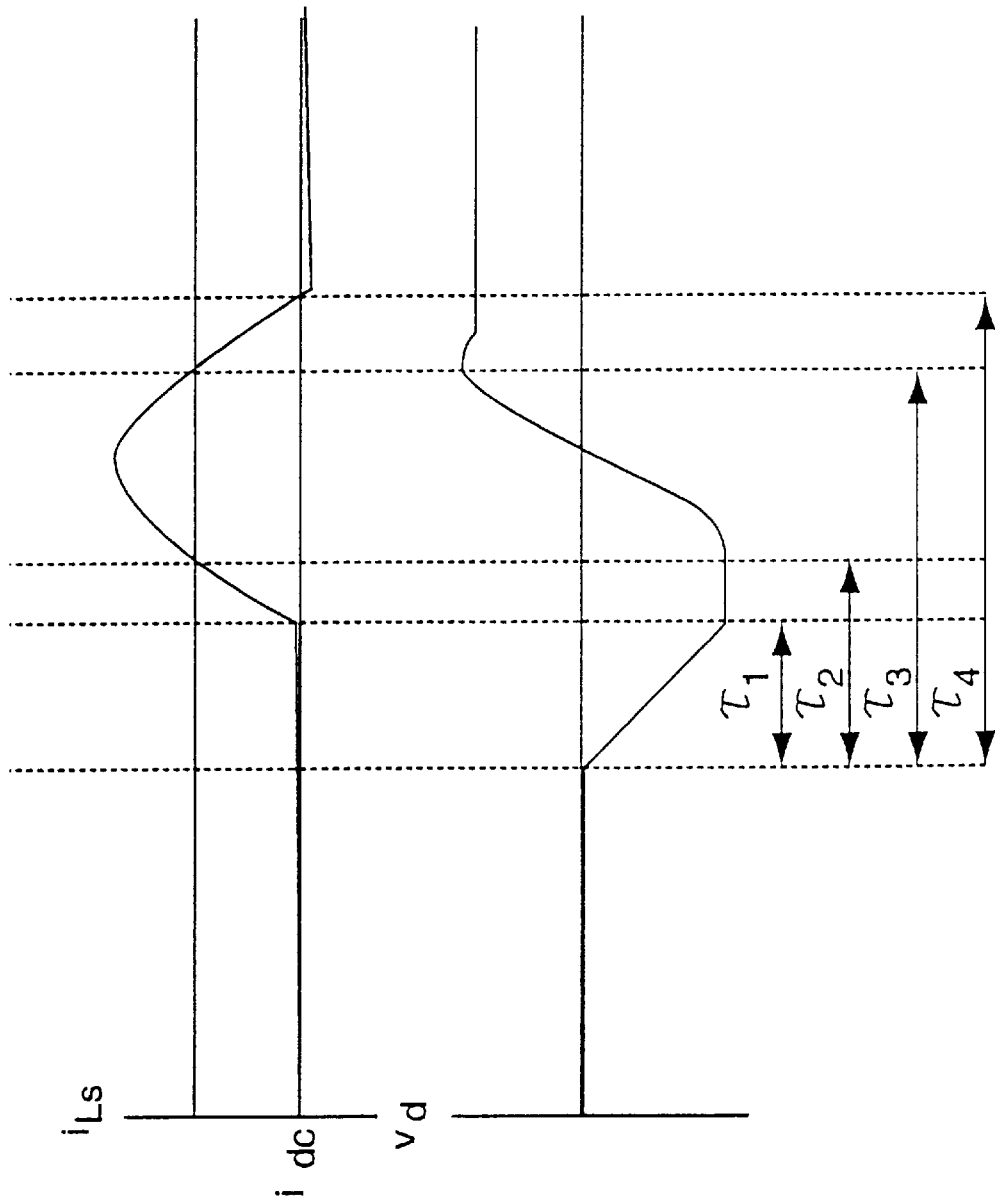
FIG. 12 is a waveform diagram illustrating the timing of exemplary switching events in an active commutation sequence in a current stiff power converter in accordance with the present invention.

The programmable timers block 164 consists of three general purpose 16-bit programmable timer circuits. These timers are used to provide signals to the gate signal decoder 166 of the switching instants in a real time frame. The six lines 167 shown correspond to the modulation switching instants (2 lines) and the active commutation sequence (4 lines), including the snubber device timing. FIG. 12 shows the time instants when switching events take place in the active commutation process. The intervals $\tau_1$ to $\tau_4$ are computed from the estimated length of the active commutation modes as given in Equations 19. Note that the reference starting point corresponds to the beginning of the active commutation sequence. From FIG. 12, it is seen that the correspondence between the intervals $\tau_1$ to $\tau_4$ and the length of the modes in the active commutation sequence is given by:

$\tau_1 = \Delta t_2$ $\tau_2 = \Delta t_2 + \Delta t_4$ $\tau_3 = \Delta t_2 + \Delta t_4 + \Delta t_5$ \qquad (20)

$\tau_4 = \Delta t_2 + \Delta t_4 + \Delta t_5$

After the completion of the active commutation process, the space vector modulation and the asociated switching pattern (as defined in Tables I–III) define the subsequent events.

In Equation 19, $\tau_2$ and $\tau_4$ establish minimum limits for two non-critical time events to occur. $\tau_2$ defines the instant after which the gate turn-on signal can be removed from the devices associated with the intermediate state during the active commutation sequence. At this point, these devices have turned off under zero current and are reversed biased. Hence, the gate turn-off command can be applied at any t such that $\tau_2 < t < \tau_3$. A similar situation happens with $\tau_4$. At this instant, the snubber device turns-off under zero current and the gate turn-off signal can be applied at $t \geq \tau_4$.

The gate signal decoder (GSD) 166 decodes the timing signals and the terminal current and voltage vector position information into real time gate command signals that are directly applied to the gate driver circuits of the converter devices. The GSD 166 controls all the switching processes. The GSD is programmed with the switching maps presented in Tables I to III. As explained before, the passive commutation sequence does not require any special attention and the timing signals are directly decoded into gate signals, with a small propagation delay added. The progress of the active commutation sequence is controlled from the timing computed based on the estimates of the length of the active commutation modes in Equation 18 and from threshold crossing feedback signals, indicating that zero voltage switching conditions have been achieved on the incoming switching device. The GSD 166 decodes the signals from the timers combined with the information on the position of the vectors $v_s$ and $i_s^*$ in the complex plane, according to the Tables I to III and zero-voltage signals obtained from direct measurement on the main converter switches.

The converter operation can be monitored based on the evolution of the voltage $v_d$ with respect to $v_{max}$ ($v_{max}$= max$\{v_{ab}, v_{bc}, v_{ca}\}$) and $v_{min}$=-$v_{max}$. Excessive levels of $v_d$ compared to $v_{max}$ and $v_{min}$ indicate improper operation of the converter. Gains $G_1$ 168 and $G_2$ 170 are used to adjust the scaling factor of the voltage $v_d$ with respect to $v_{max}$ and $v_{min}$. The outputs of the comparators 172 and 174 are then used to trigger fault protection modes also programmed in the GSD 166. Further improvement in converter protection is introduced if the state of the switching devices fed back to the GSD 166 on lines 176 is also used to monitor the converter state. In this case, it is possible to detect failure in individual switching devices.

The GSD 166 can be implemented using a variety of presently available programmable logic devices, such as PROM's, EPROM's, PAL's, GAL's and other more advanced circuits.

FIGS. 13 to 21 illustrate the operation of the rectifier in FIG. 6 under three different conditions: rectifier with cosΦ= 1.0; inverter with cosΦ=0.9 (leading) and inverter with cosΦ=0.5 (leading). These operating conditions were selected based on the typical operating conditions encountered in an induction motor drive. The converter is assumed to operate with a terminal voltage of 2300 $V_{rms}$ (line to line) and injecting three phase AC currents of 85$A_{rms}$. The converter operates with a DC bus current of 150 A and the switching frequency is set at 4 kHz. The ripple on the DC bus current and terminal voltages has been neglected.

Figure 13:
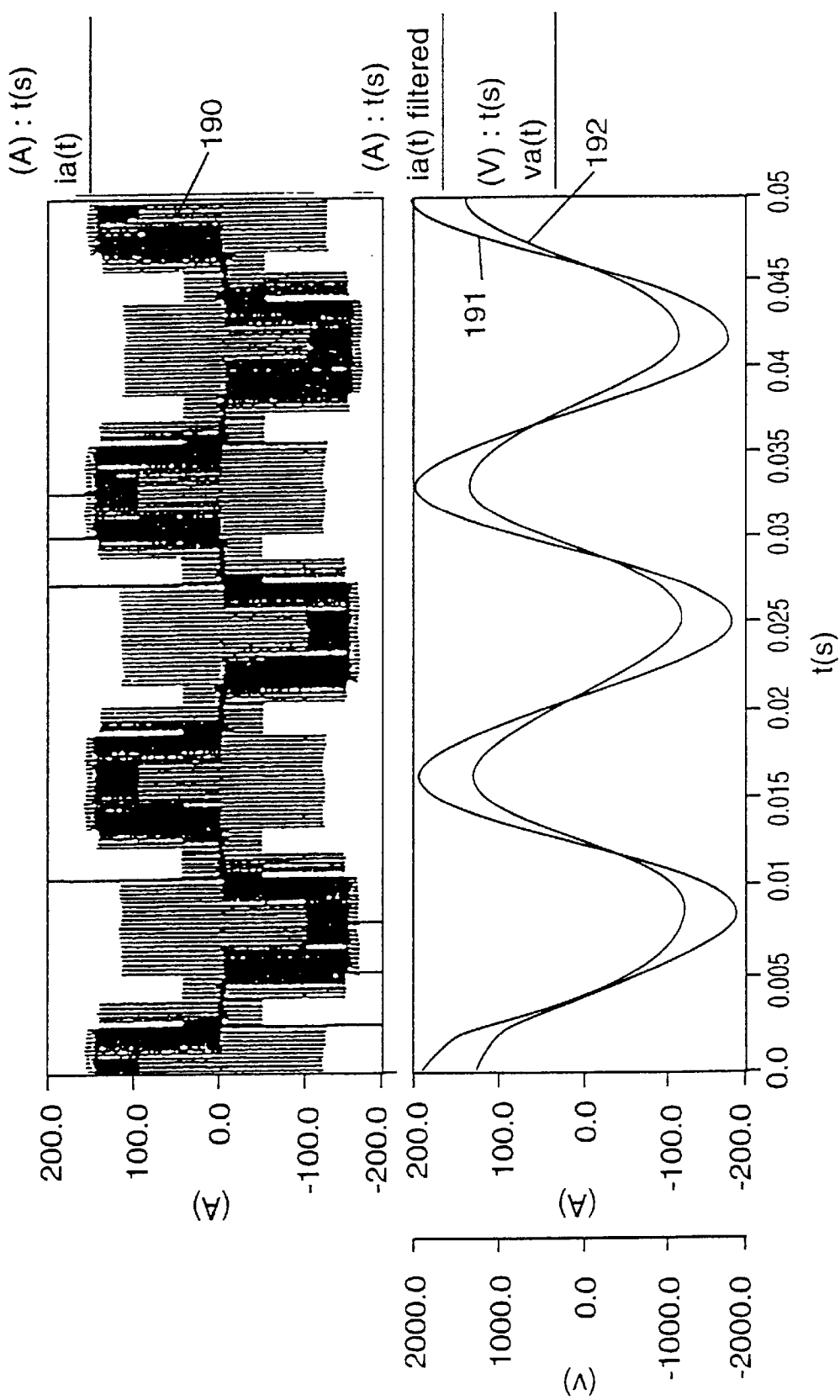
Figure 14:
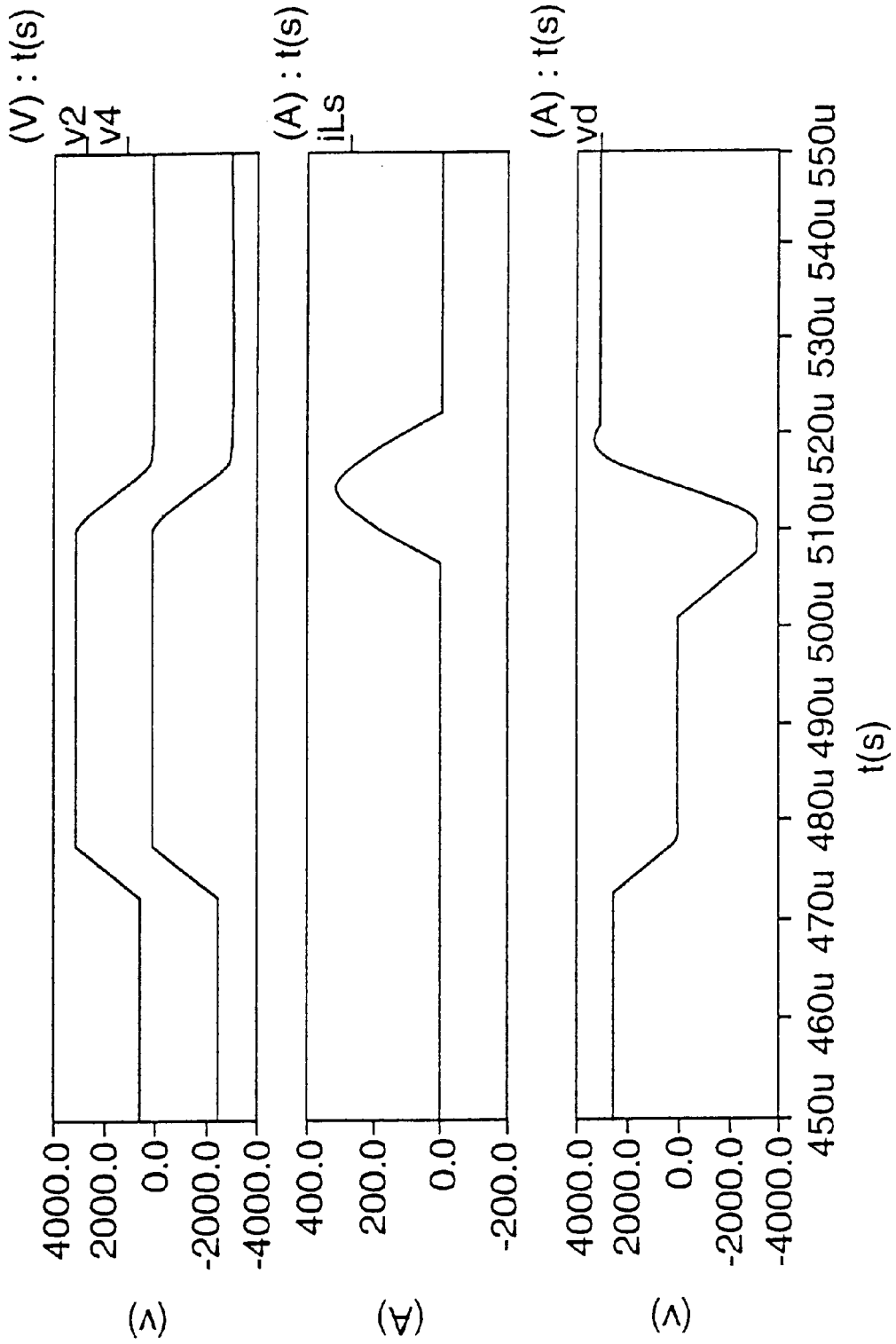
Figure 15:
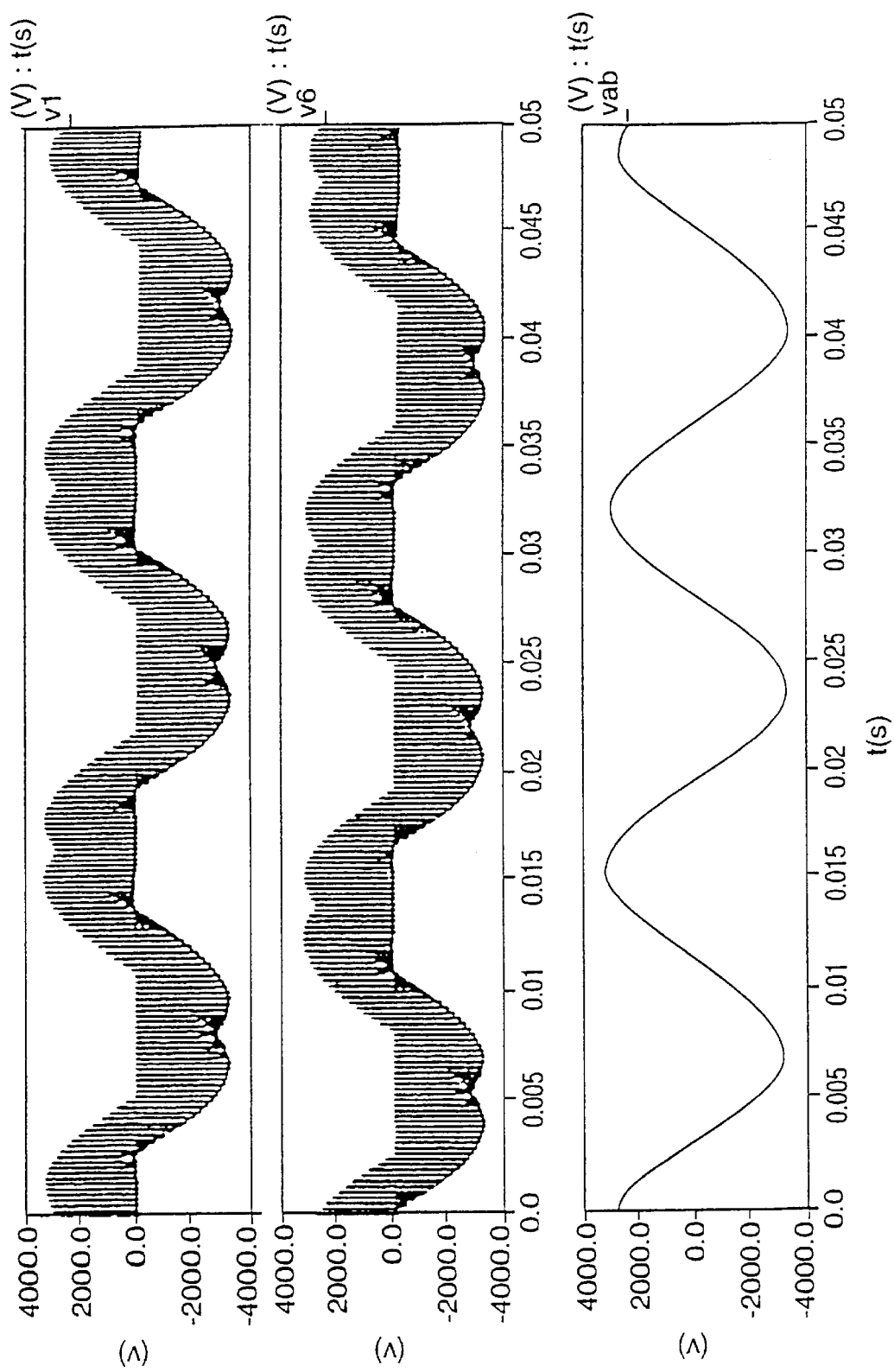
Figure 16:
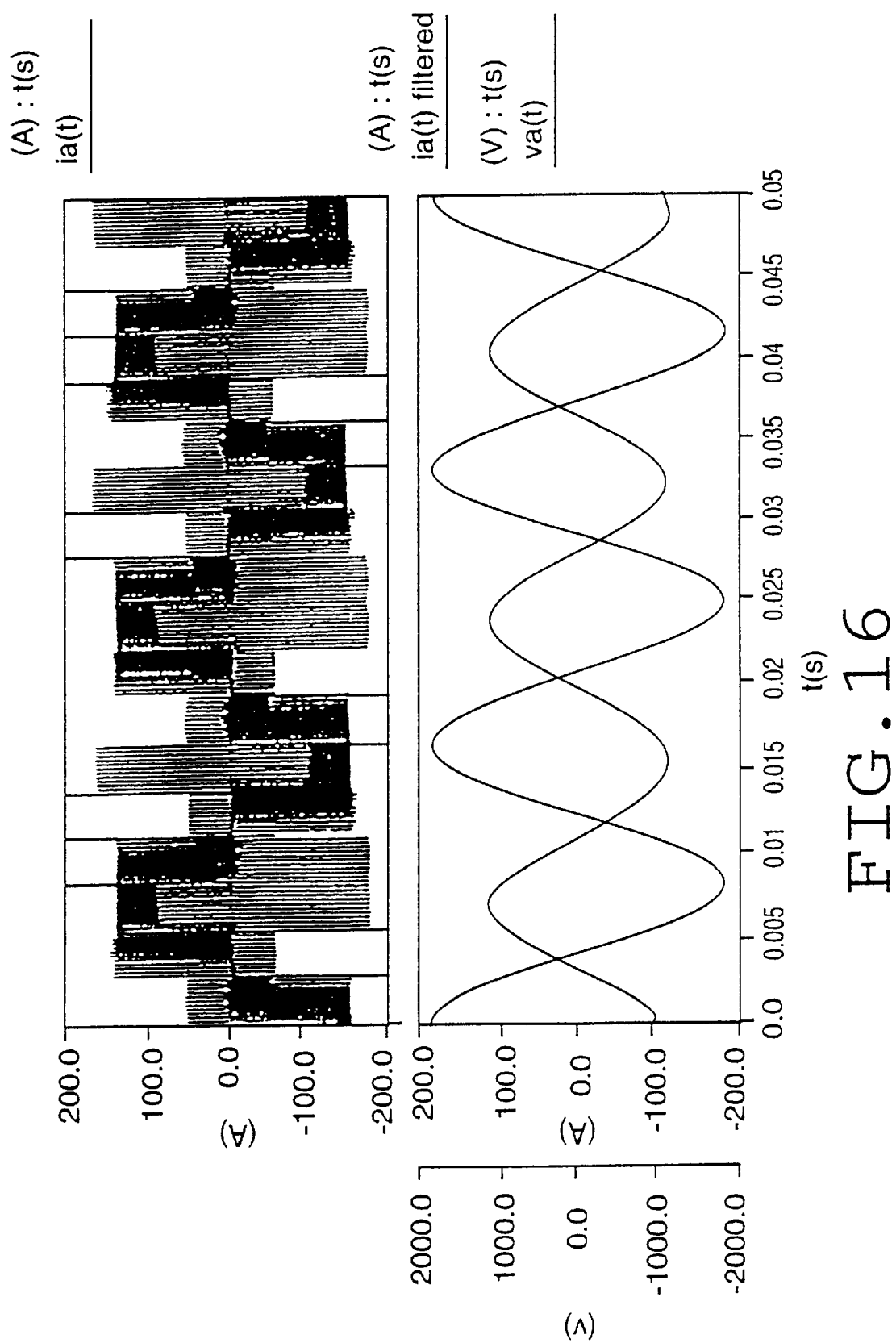
Figure 17:
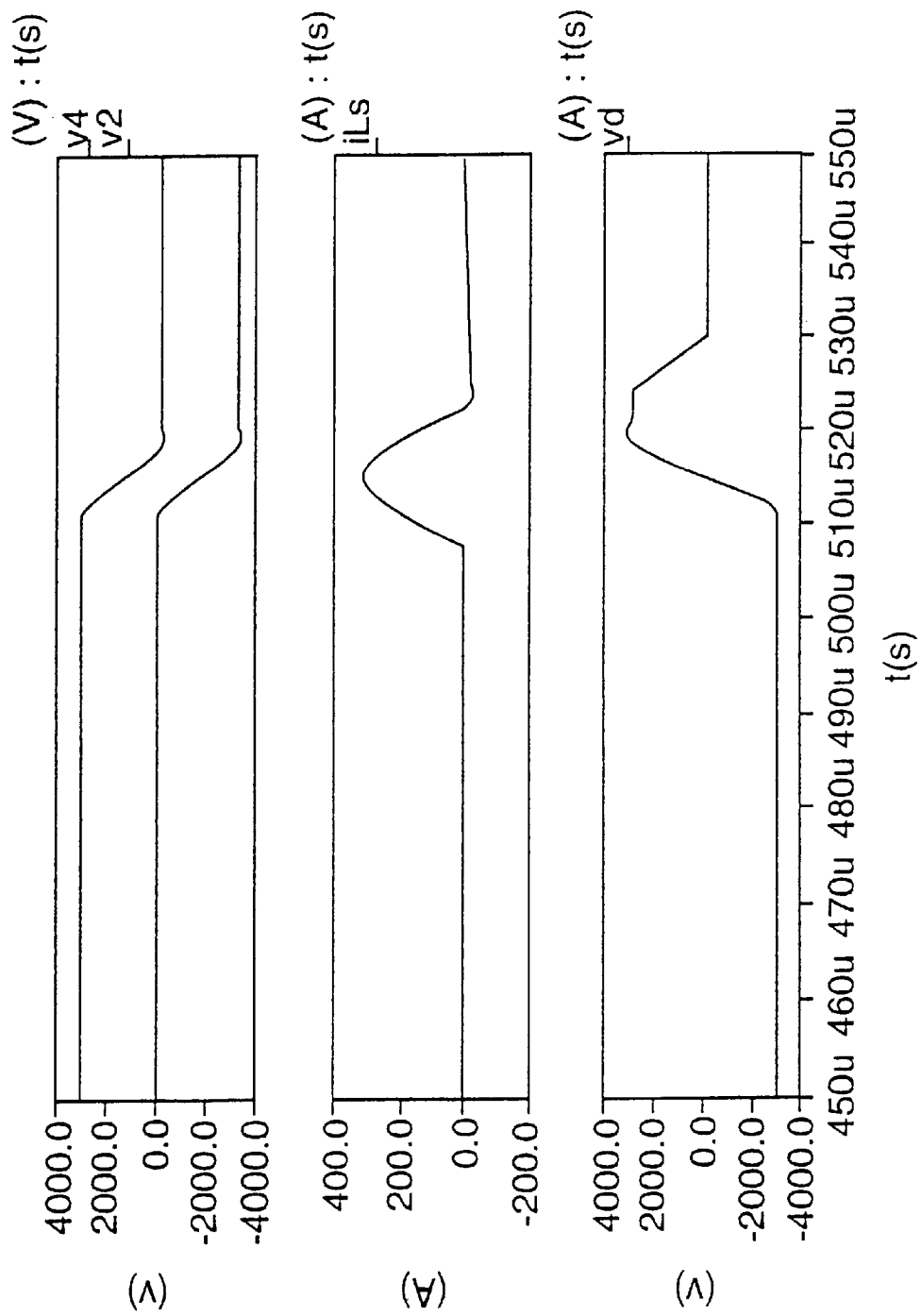
Figure 18:
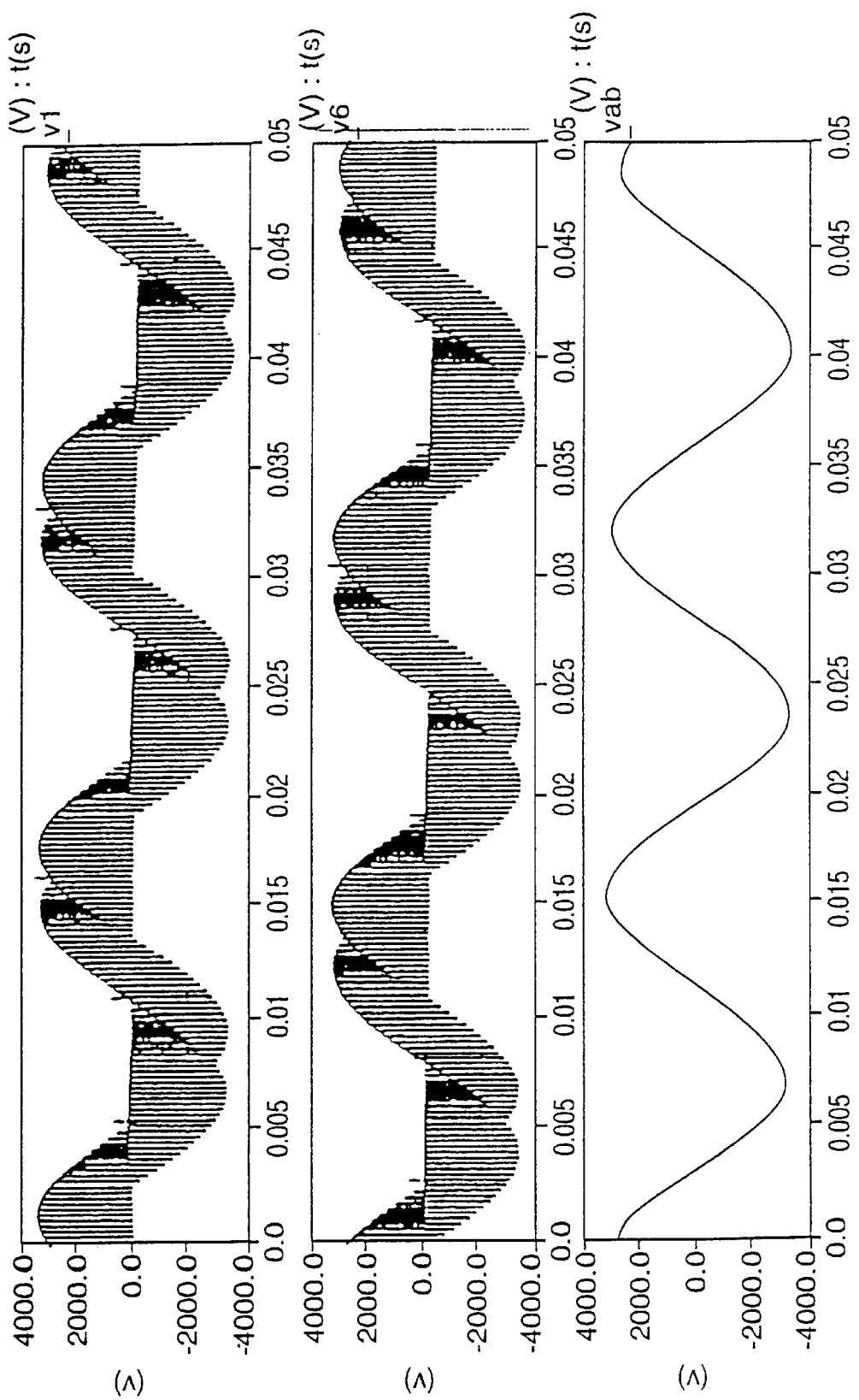
Figure 19:
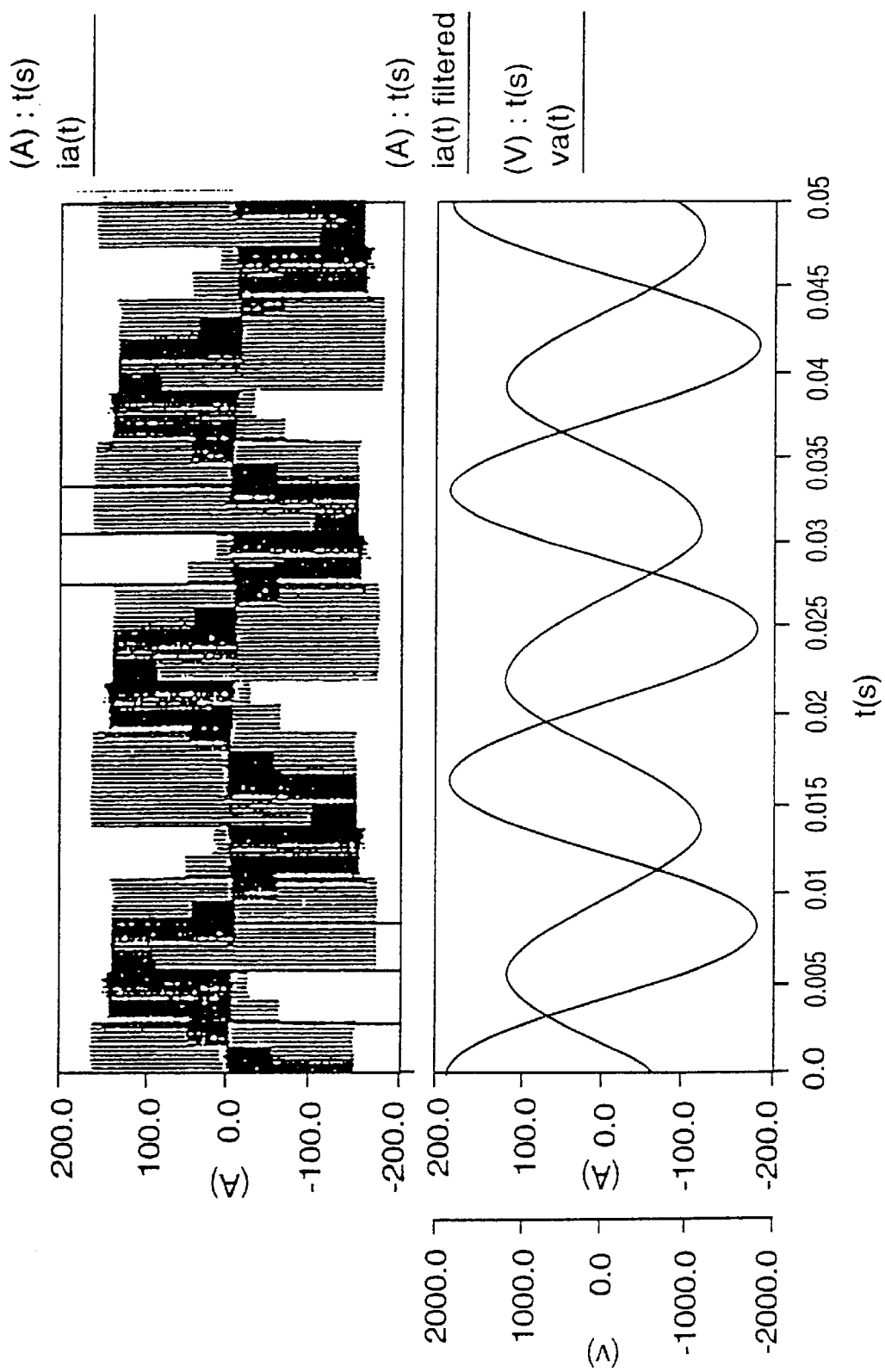
Figure 20:
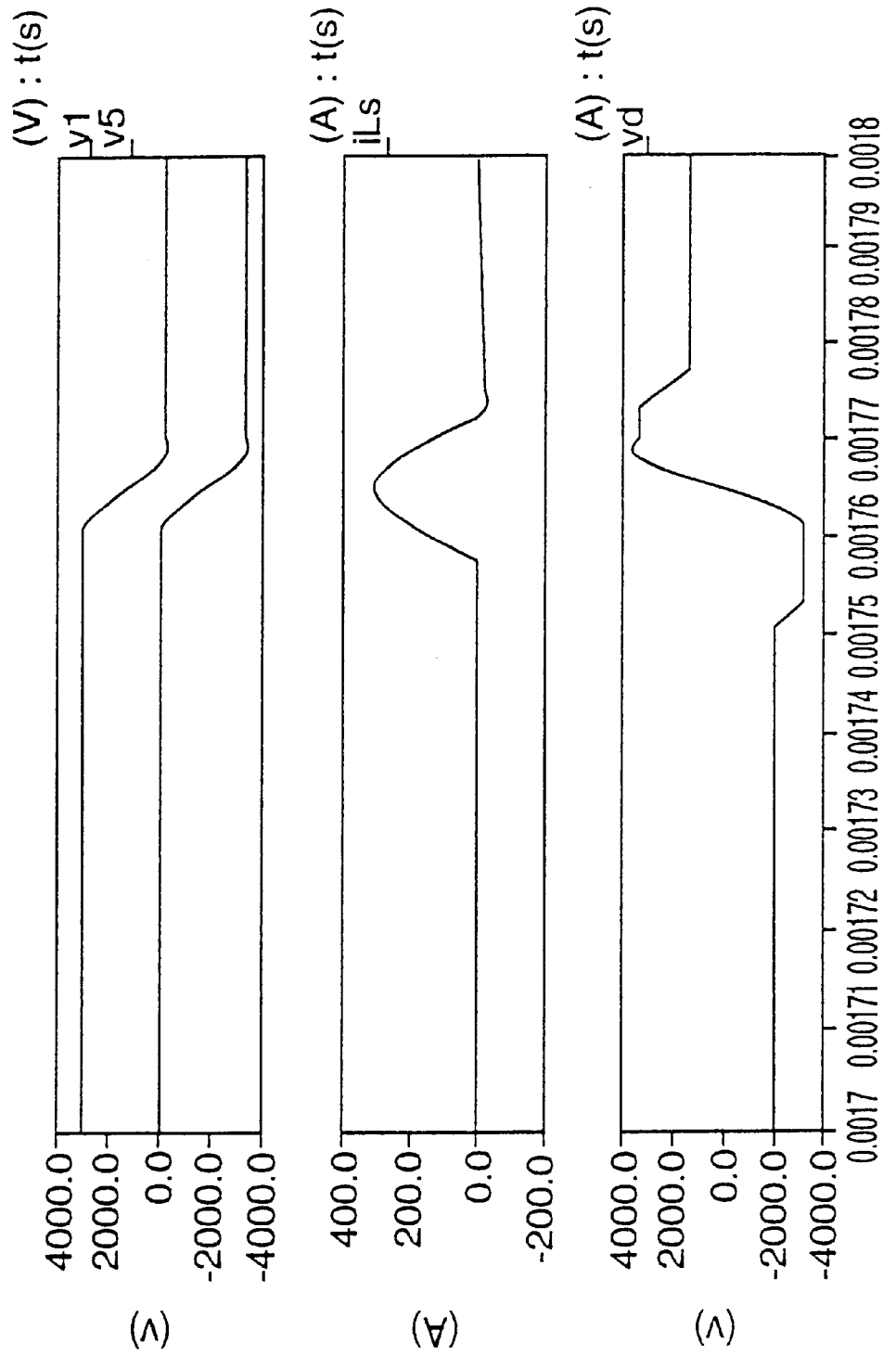
Figure 21:
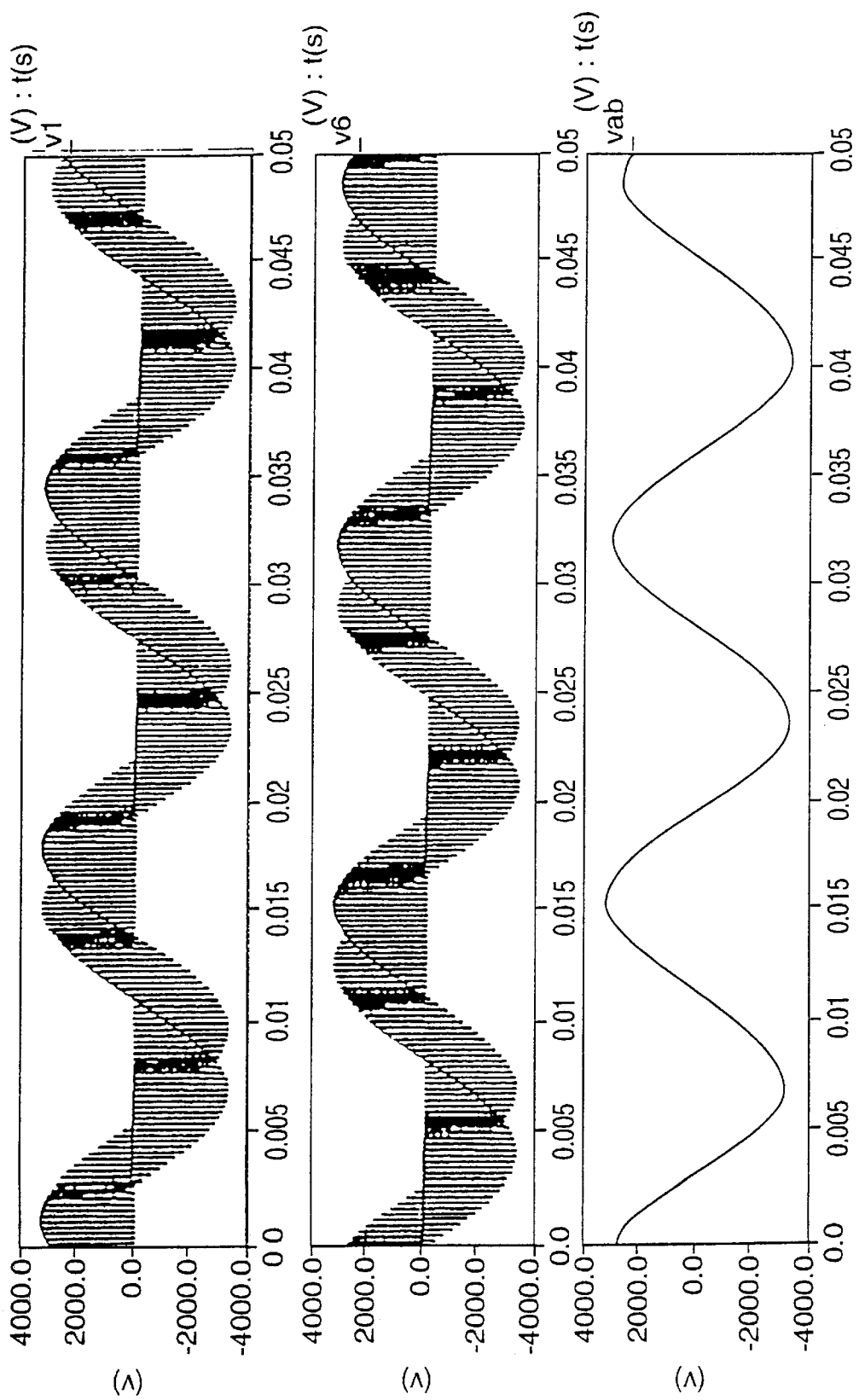

FIGS. 13 to 15 show the plots from the rectifier operating mode. The converter terminal currents (unfiltered 190 and filtered 191) are shown in FIG. 13. This figure also shows the filtered terminal voltage 192 in phase a, where unity power factor operation is promptly seen. FIG. 14 shows the active commutation waveforms for the rectifier operation. FIG. 14 shows the voltage across devices $S_1$ and $S_6$. It is seen that the maximum voltage stress is limited to the peak line to line voltage (voltage $v_{ab}$ is also shown for comparison).

Similar results are shown in FIGS. 16 to 18 and FIGS. 19 to 21 for the inverter mode with cosΦ=0.9 (leading) and cosΦ=0.5 (leading), respectively. The latter mode implies continuous transition from the inverter to the reactor mode. Smooth transition between rectifier/inverter/reactor modes is guaranteed by the control strategy as explained earlier.

If a three phase machine, such as an induction monitor or synchronous machine is driven by a power converter in accordance with the present invention, the losses in the motor will be inherently decreased. The three phase capacitor bank present at the inverter AC terminals (inherent to all current stiff converter topologies and minimized in this particular one due to its high switching frequency capability) combined with a motor leakage reactance forms a second order low pass filter. The high frequency current components present at the inverter terminals are significantly attenuated, leading to a motor current with minimum harmonic content. As a result, the losses in a motor associated with the current harmonics are also significantly reduced on the order of $I_h^2$, where $I_h$ is the total rms value of the harmonic current. This filtering effect is more effective in this topology due to the converter PWM capability at high switching frequencies.

The terminal capacitors of current stiff converters also limit the rate of change of the voltage across the motor terminals (dv/dt). Typical electromagnetic compatibility problems between converter and motor related to high dv/dt are thus eliminated (stress on the insulation of the motor windings, bearing currents and other stray currents coupled through the internal motor capacitances).

A gate drive circuit 200 that may be used for driving the corresponding gate of each of the switching devices 30–35, 60–65, 82 and 86 of a power conversion circuit 10 are illustrated in FIG. 22. The gate drive circuit 200 includes optical isolators 202 and 203, a comparator 204, and a gate driver 206. A gate switch command from the firing and control circuit 22 is fed to the optical isolator 203 via a line 208. The voltage $V_{SW}$ at the anode 210 of the switching device 212 is compared to a threshold voltage $V_{THRES}$ via the comparator 204. The output signal from the comparator 204 is fed back to the GSD 166 (FIG. 10), for proper control of the active commutation device, on line 214, via optical isolator 202. The output of the comparator 204 is also fed as a second input to an AND gate 216. The output signal from the AND gate 216 is fed to the gate driver 208 which applies the appropriate signal to the gate of the switching device 212 to drive the switch on and off as required. In this manner, the gate drive circuit 200 forces the switch to turn off and disable a turn-on command (i.e., from the firing and control circuit 22 via the line 208) whenever a forward voltage across the switch is larger than a predetermined threshold level corresponding to $V_{THRES}$. The gate drive circuit 200 thus prevents the switching device 212 from being turned on until a zero voltage switching condition is achieved.

From the foregoing, it will be observed that numerous modifications and variations can be effected without departing from the true spirit and scope of the novel concept of the present invention. It will be appreciated that the present disclosure is intended as an exemplification of a current stiff converter with resonant snubbers in accordance with the present invention, and is not intended to limit the converter or the control circuit therefore to the specific embodiments illustrated. This invention embraces all modified forms of the embodiments described herein which come within the scope of the following claims.

What is claimed is:

1. A current stiff power conversion system, comprising:
   (a) a bridge of power conversion switching devices connected across DC bus lines and responsive to power conversion switching device control signals;
   (b) a snubber capacitor connected across each of the power conversion switching devices;
   (c) an active commutation unit connected across the DC bus lines in parallel with the bridge of power conversion switching devices and responsive to active commutation switching control signals; and
   (d) controller means for providing the power conversion switching device control signals to the power conversion switching devices and the active commutation switching control signals to the active commutation unit such that the power conversion switching devices are controlled to turn on and off under approximately zero voltage switching conditions and to create a zero current switching condition for the active commutation unit and such that the active commutation unit is controlled to turn on and off under said zero current switching condition to establish a resonance between the snubber capacitors and the active commutation unit to establish said approximately zero voltage switching conditions.

2. The current stiff power conversion system of claim 1 wherein the voltage across incoming power conversion switching devices is reduced to zero before the incoming switching devices are turned on.

3. The current stiff power conversion system of claim 1 wherein the power conversion switching devices are gate-turn-off thyristors.

4. The current stiff power conversion system of claim 1 wherein the bridge of power conversion switching devices forms a rectifier connecting AC input lines to the DC bus lines and wherein the controller means includes means for providing power conversion switching device control signals to the power conversion switching devices to generate a DC output signal on the DC bus lines from an AC input signal on the AC input lines.

5. The current stiff power conversion system of claim 4 wherein the controller means includes means for providing PWM switching device control signals to the power conversion switching devices to generate the DC output signal on the DC bus lines from the AC input signal on the AC input lines.

6. The current stiff power conversion system of claim 1 wherein the bridge of power conversion switching devices forms an inverter connecting the DC bus lines to AC output lines and wherein the controller means includes means for providing power conversion switching device control signals to the power conversion switching devices to generate an AC output signal on the AC output lines from a DC input signal on the DC bus lines.

7. The current stiff power conversion system of claim 6 wherein the controller means includes means for providing PWM switching device control signals to the power conversion switching devices to generate the AC output signal on the AC output lines from the DC input signal on the DC bus lines.

8. The current stiff power conversion system of claim 1 wherein the active commutation unit includes and active commutation unit inductor connected in series with an active commutation unit switching device responsive to the active commutation switching control signals.

9. The current stiff power conversion system of claim 8 wherein the active commutation unit switching device is a gate-turn-off thyristor.

10. The current stiff power conversion system of claim 1 wherein the controller means includes means for providing power conversion switching device control signals to the power conversion switching devices to control the power conversion switching devices after an outgoing switching device is tuned off but before the active commutation unit is turned on to establish a desired snubber driving voltage.

11. A current stiff power conversion system, comprising:
(a) a rectifier bridge of rectifier switching devices forming a rectifier connected between AC input lines and DC bus lines and responsive to rectifier switching device control signals;
(b) a rectifier snubber capacitor connected across each of the rectifier switching devices;
(c) a first active commutation unit connected across the DC bus lines in parallel with the bridge of rectifier switching devices and responsive to first active commutation switching control signals;

(d) an inverter bridge of inverter switching devices forming an inverter connected between the DC bus lines and AC output lines and responsive to inverter switching device control signals;
(e) an inverter snubber capacitor connected across each of the inverter switching devices;
(f) a second active commutation unit connected across the DC bus lines in parallel with the bridge of inverter switching devices and responsive to second active commutation switching control signal; and
(g) controller means for providing the rectifier switching device control signals to the rectifier switching devices and the first active commutation switching control signals to the first active commutation unit to control the rectifier switching devices to turn on and off under approximately zero voltage switching conditions to generate a DC signal on the DC bus lines from an AC signal on the AC input lines and to establish a zero current switching condition for the first active commutation unit and for controlling the first active commutation unit to turn on and off under said zero current switching condition to establish a resonance between the first active commutation unit and the rectifier snubber capacitors to establish said zero voltage switching condition for said rectifier switching devices, and for providing the inverter switching device control signals to the inverter switching devices and the second active commutation switching control signals to the second active commutation unit to control the inverter switching devices to turn on and off under approximately zero voltage switching conditions to generate an AC signal on the AC output lines from the DC signal on the DC bus lines and to establish a zero current switching condition for the second active commutation unit and for controlling the second active commutation unit to turn on and off under said zero current switching condition to establish a resonance between the second active commutation unit and the inverter snubber capacitors to establish said zero voltage switching condition for said inverter switching devices.

12. The current stiff power conversion system of claim 11 wherein the voltage across incoming rectifier and inverter switching devices is reduced to zero before the incoming inverter and rectifier switching devices are turned on.

13. The current stiff power conversion system of claim 11 wherein the rectifier and inverter switching devices are gate-turn-off thyristors.

14. The current stiff power conversion system of claim 11 wherein the controller means includes means for providing PWM switching device control signals to the rectifier and inverter switching devices to control the rectifier switching devices to generate the DC signal on the DC bus lines from the AC input signal on the AC input lines and to control the inverter switching devices to generate the AC output signal on the AC output lines from the DC signal on the DC bus lines.

15. The current stiff power conversion system of claim 11 wherein the first and second active commutation units each include an active commutation unit inductor connected in series with an active commutation unit switching device responsive to the first or second active commutation switching control signals.

16. The current stiff power conversion system of claim 15 wherein the active commutation unit switching devices are gate-turn-off thyristors.

17. The current stiff power conversion system of claim 11 wherein the controller means includes means for providing rectifier switching device control signals to the rectifier switching devices to control the rectifier switching devices after an outgoing rectifier switching device is turned off but before the first active commutation unit is turned on to establish a first desired snubber driving voltage, and for providing inverter switching device control signals to the inverter switching devices to control the inverter switching devices after an outgoing inverter switching device is turned off but before the second active commutation unit is turned on to establish a second desired snubber driving voltage.

18. A method for controlling a current stiff power conversion system having a bridge of power conversion switching devices connected across DC bus lines to achieve approximately zero-voltage turn on and turn off the power conversion switching devices, comprising the steps of:

(a) connecting a snubber capacitor across each of the power conversion switching devices in the bridge of power conversion switching devices;

(b) connecting an active commutation unit in parallel with the bridge of power conversion switching devices across the DC bus lines;

(c) turning off an outgoing one of the power conversion switching devices;

(d) controlling the power conversion switching devices to establish a zero current switching condition for the active commutation unit;

(e) turning on the active commutation unit under said zero current switching condition to establish a resonance between the snubber capacitors and the active commutation unit to reduce a voltage across the incoming power conversion switching device to approximately zero; and (f) turning on the incoming power conversion switching device when the voltage across the incoming power conversion switching device is approximately zero.

19. The method of claim 18 wherein the voltage across the incoming power conversion switching device is reduced to zero before the incoming switching device is turned on.

20. The method of claim 18 wherein the bridge of power conversion switching devices forms a rectifier connecting AC input lines to the DC bus lines and including the step of repeating the steps of turning off an outgoing power conversion switching device and turning on an incoming power conversion switching device in a pattern to generate a DC output signal on the DC bus lines from an AC input signal on the AC input lines.

21. The method of claim 20 wherein the steps of turning off an outgoing power conversion switching device and turning on an incoming power conversion switching device are repeated in a PWM pattern to generate the DC output signal on the DC bus lines from the AC input signal on the AC input lines.

22. The method of claim 18 wherein the bridge of power conversion switching devices forms an inverter connecting the DC bus lines to AC output lines and including the step of repeating the steps of turning off an outgoing power conversion switching device and turning on an incoming power conversion switching device in a pattern to generate an AC output signal on the AC output lines from a DC input signal on the DC bus lines.

23. The method of claim 22 wherein the steps of turning off an outgoing power conversion switching device and turning on an incoming power conversion switching device are repeated in a PWM pattern to generate the AC output signal on the AC output lines from the DC input signal on the DC bus lines.

24. The method of claim 18 wherein the active commutation unit includes and active commutation unit inductor connected in series with an active commutation unit switching device and wherein the step of turning on the active commutation unit includes the step of turning on the active commutation unit switching device.

25. The method of claim 18 wherein the step of controlling the power conversion switching devices includes the step of turning on a power conversion switching device after an outgoing switching device is tuned off but before turning on the active commutation unit to establish the resonance between the snubber capacitors and the active commutation unit to establish a desired snubber driving voltage.

* * * * *

UNITED STATES PATENT AND TRADEMARK OFFICE
CERTIFICATE OF CORRECTION

PATENT NO. : 5,949,664
DATED : September 7, 1999
INVENTOR(S) : Steffen Bernet et al.

It is certified that error appears in the above-identified patent and that said Letters Patent is hereby corrected as shown below:

Column 3,
Line 23 of the patent, the word "front" should be in bold print.

Column 13,
Line 48 of the patent, delete "$(t_1 \leq t < t_{02})$" and insert in its place -- $(t_1 \leq t < t_2)$ --.

Column 16,
Approximately line 18 in Table I, delete "8,10" and insert in its place -- 7,8 --.
Between lines 20 and 22 in Table I, insert the following:

-- 8,9   9,10   $i_0 \longrightarrow (i_2) \xrightarrow{a} i_5 \xrightarrow{p} i_4 \xrightarrow{p} i_0$ --.

Column 18,
Line 39 of the patent, delete "two is, switching" and insert in its place
-- two switching --.

Column 21,
Line 48 of the patent, delete "FIG. 14" and insert in its place -- FIG. 15 --.

Column 13,
Line 26 of the patent, delete the period after the word "circuit." and insert in its place
-- circuit --.

Column 23, claim 8,
Line 43, delete "and active" and insert in its place -- an active --.

Column 26, claim 24,
Line 28, delete "and active" and insert in its place -- an active --.

UNITED STATES PATENT AND TRADEMARK OFFICE
CERTIFICATE OF CORRECTION

PATENT NO. : 5,949,664
DATED : September 7, 1999
INVENTOR(S) : Steffen Bernet et al.

It is certified that error appears in the above-identified patent and that said Letters Patent is hereby corrected as shown below:

<u>Column 26, claim 25,</u>
Line 36, delete "tuned" and insert in its place -- turned --.

Signed and Sealed this

Eighth Day of January, 2002

*Attest:*

JAMES E. ROGAN
*Director of the United States Patent and Trademark Office*

*Attesting Officer*